(12) United States Patent
Laurens et al.

(10) Patent No.: US 9,376,291 B2
(45) Date of Patent: Jun. 28, 2016

(54) HEAVY LIFTING APPARATUS AND METHOD

(75) Inventors: Jean Marie Laurens, Lausanne (CH); Guy Russell, Singapore (SG); Walter Althaus, Singapore (SG); Max Ernst Meyer, Singapore (SG)

(73) Assignee: VSL International AG (CH)

( * ) Notice: Subject to any disclaimer, the term of this patent is extended or adjusted under 35 U.S.C. 154(b) by 5 days.

(21) Appl. No.: 14/374,964

(22) PCT Filed: Feb. 1, 2012

(86) PCT No.: PCT/EP2012/051635
§ 371 (c)(1),
(2), (4) Date: Nov. 3, 2014

(87) PCT Pub. No.: WO2013/113377
PCT Pub. Date: Aug. 8, 2013

(65) Prior Publication Data
US 2015/0048043 A1    Feb. 19, 2015

(51) Int. Cl.
*B66C 23/26* (2006.01)
*B66C 23/20* (2006.01)

(52) U.S. Cl.
CPC .................................. *B66C 23/207* (2013.01)

(58) Field of Classification Search
USPC .......................................................... 212/175
See application file for complete search history.

(56) References Cited

U.S. PATENT DOCUMENTS

2003/0183594 A1* 10/2003 Torres Martinez ... B66C 23/207
212/196

FOREIGN PATENT DOCUMENTS

| EP | 1239150 A2 | 9/2002 |
| FR | 2903739 A1 | 1/2008 |
| WO | 9721621 A1 | 6/1997 |
| WO | 2011050812 A1 | 5/2011 |

OTHER PUBLICATIONS

International Search Report dated Sep. 26, 2012 for PCT/EP2012/051635.

* cited by examiner

*Primary Examiner* — Emmanuel M Marcelo
(74) *Attorney, Agent, or Firm* — Abel Law Group, LLP

(57) ABSTRACT

A crane apparatus and method are described for lifting a heavy load such as a wind-turbine generator unit 46 on to a wind-turbine tower 1. The crane is designed to climb up cables 3 attached to the top of the tower, carrying with it the cables 45 and lifting gear 31 which will be required for the main lifting operation. The crane comprises a pair of jib-frames 20 with boom arms 26, 27 which can be retracted during lifting and then deployed to a pivotable, loadbearing position once the crane is mounted at the top of the tower 1. Hydraulic strand jacks 31 and heavy-duty strands 45 are preferably used for the heavy lifting. In a preparation step, a load-bearing bracket assembly 13, 14, to which the jib-frames 20 will be secured, is hoisted up and fitted to the top of the tower 1. Once the lifting operations are complete, the crane assembly and the bracket assembly 13, 14 are lowered from the tower 1 and removed from site.

14 Claims, 20 Drawing Sheets

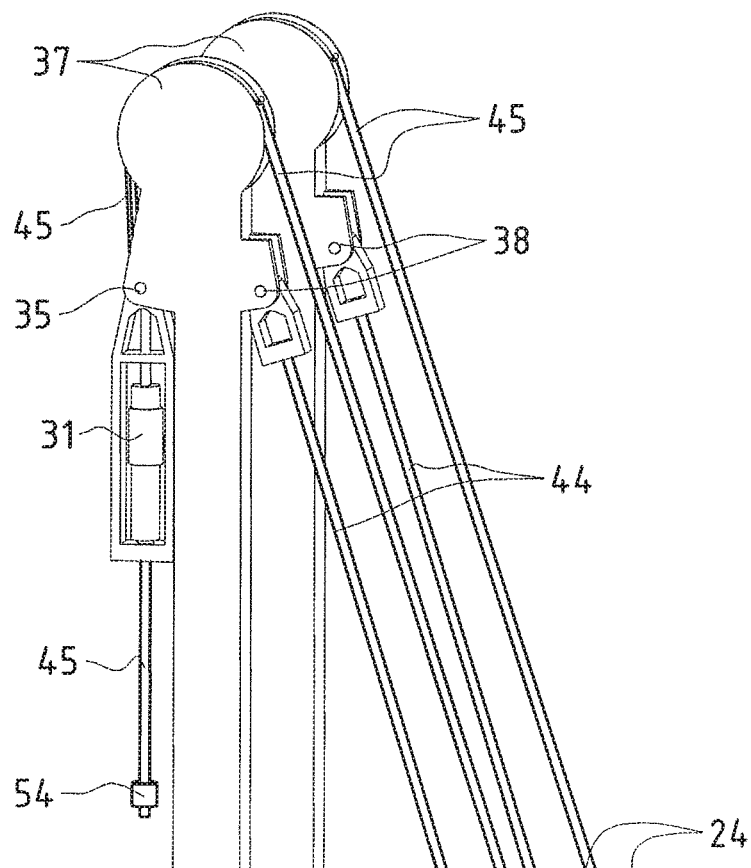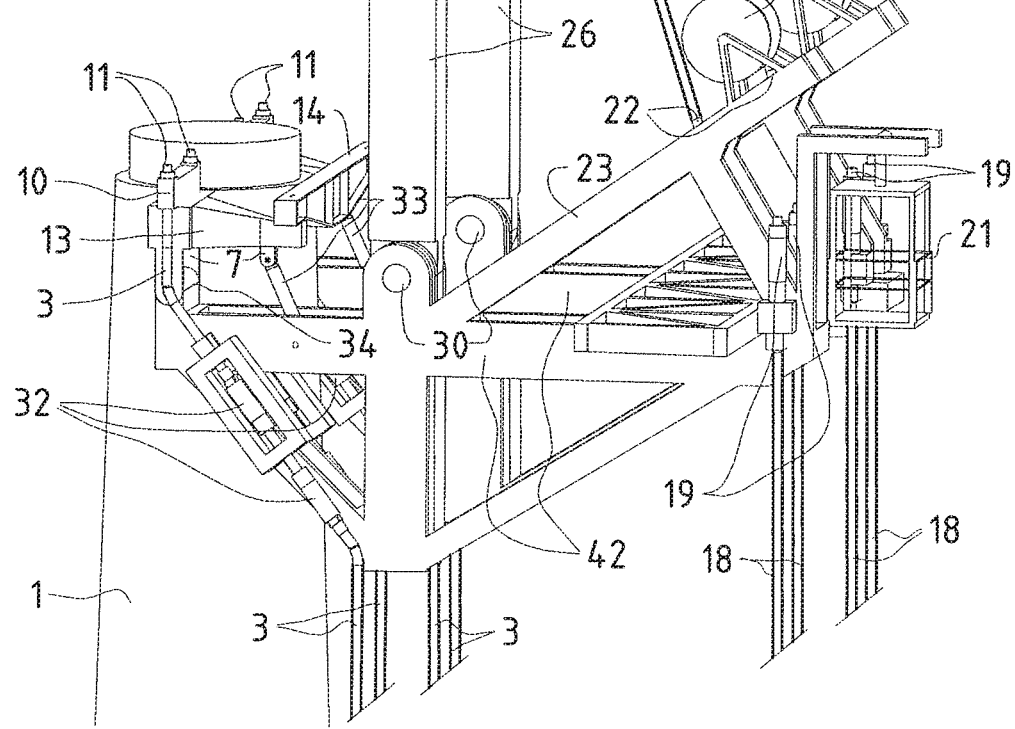
FIG. 17

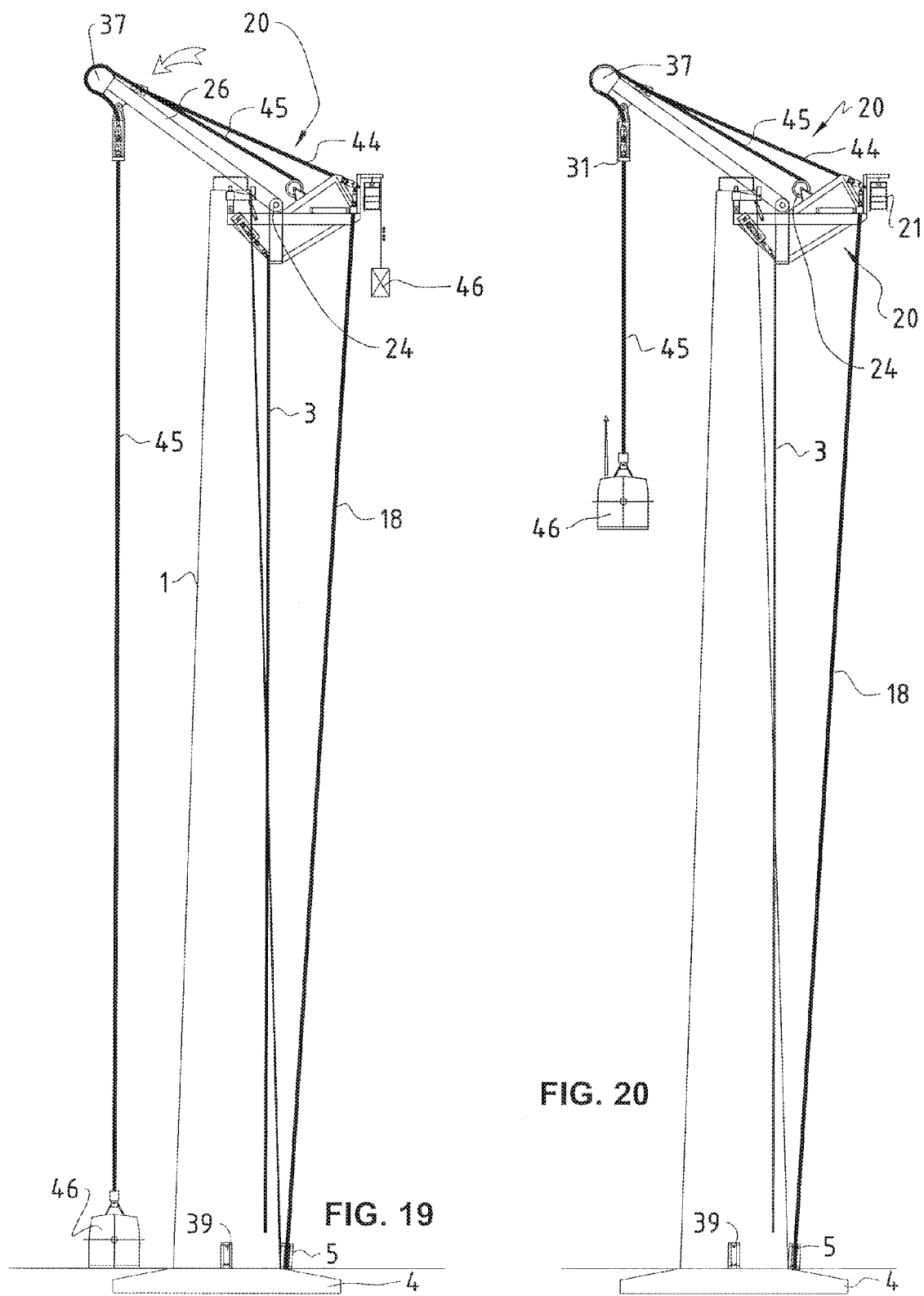

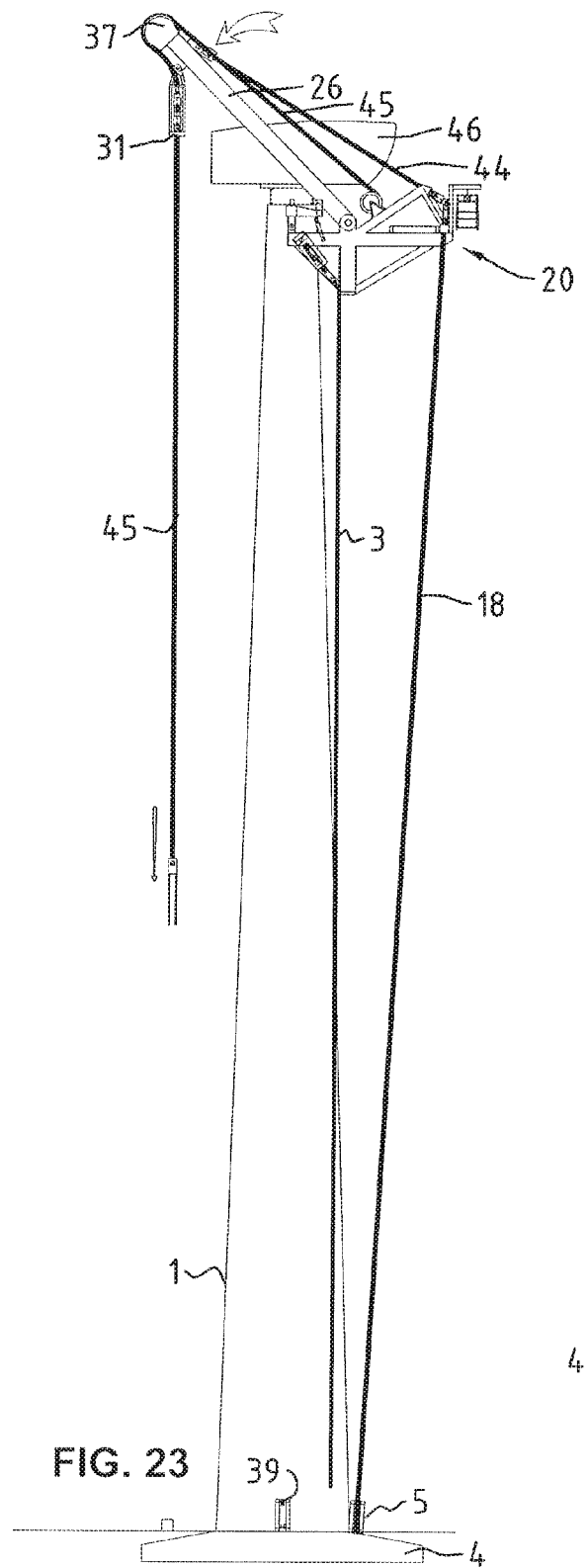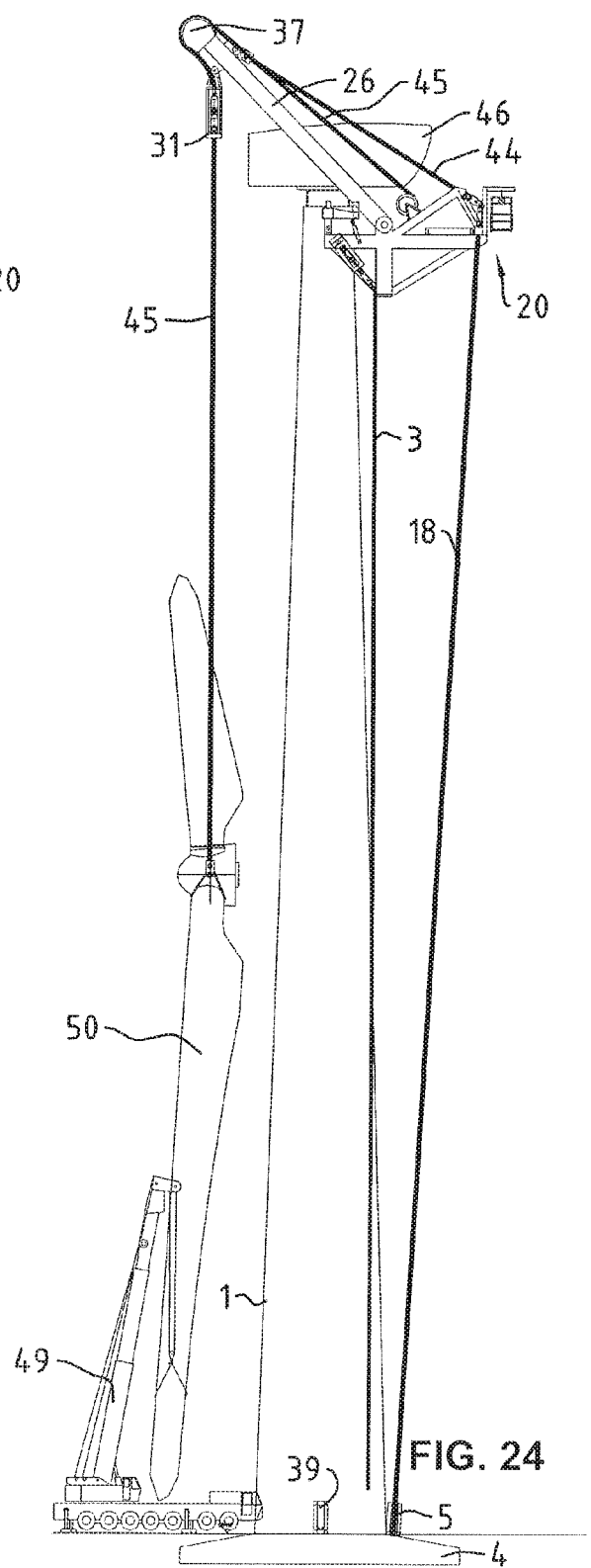

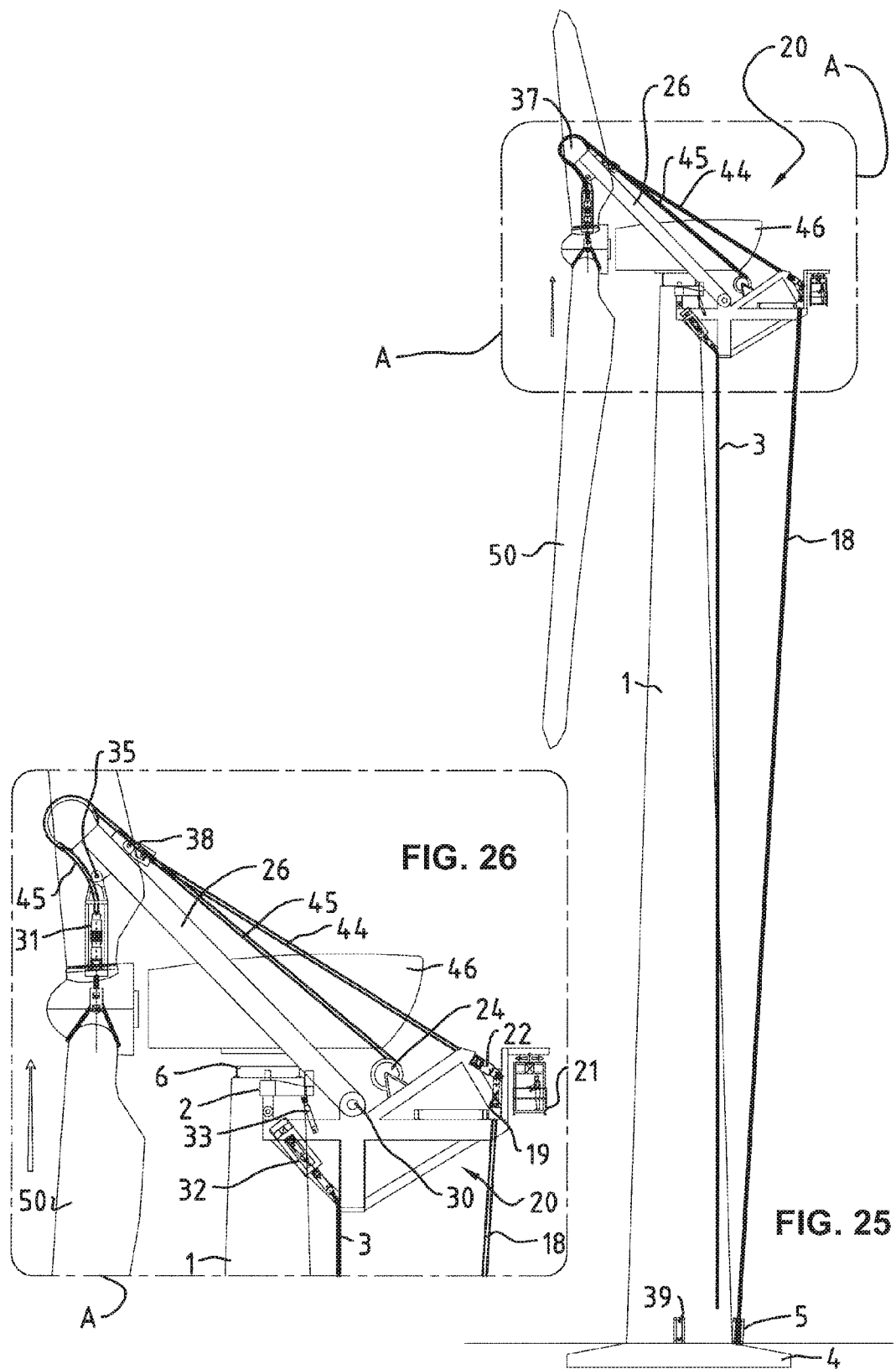

HEAVY LIFTING APPARATUS AND METHOD

The invention relates to the field of the lifting of heavy loads on to tall structures and in particular, but not exclusively, to lifting wind-turbine generator units, rotors and/or blades between ground level and the top of wind turbine towers.

The height of wind turbine towers continues to increase, and the size and weight of the generator units to be installed on top of such towers is also increasing accordingly. Tower heights of 150 m or 200 m are being considered, with generator units which may weigh 500 or 600 tonnes or more, and it is to be expected that future wind turbines will require yet taller towers and/or yet heavier generator units. Such heights and weights are out of reach of conventional cranes, so new ways are needed to lift heavy loads on to the top of such towers.

International patent application WO97/21621 (Tymon Corporation) proposes a pivotable crane apparatus which can be hoisted to the top of a tower, where it can be used to lift a generator unit. This prior art crane is constructed as two jib-frames, straddling the tower, which are raised into position by means of a winch at the base of the tower, and mounted on a pivot axis attached to the tower some distance from the top. The lifting of the generator unit is likewise accomplished by means of a winch at the base of the tower. In order to improve the mechanical advantage of the generator-lifting equipment, it is suggested to use a block-and-tackle instead of the simple pulley arrangement described. The positioning of the generator unit on the tower is accomplished by pivoting the jib members, again by means of cables and winches on the ground.

Such prior art heavy lifting arrangements are relatively complex, and require a sturdy foundation for securing the winches, especially for the hauling winch which is used to lift the generator. Such arrangements can also give rise to large temporary loadings in the tower structure which may impose critical structural design requirements for the tower. The prior art method also requires teams of people on the ground and on the tower and/or reliable remote control systems for communication between tower and ground. The prior art system is also significantly limited in the weight of load which can be lifted. Pulley or block-and-tackle arrangements can only be used with relatively flexible ropes capable of bending around the pulleys, while under tension, without losing strength, and this limitation in turn limits the load-bearing capacity of the prior art lifting system. This limitation applies not only to the weight of the main load to be lifted, but also to the weight of the crane itself, which is also winched up the tower using ropes and pulleys.

In order to overcome the above and other disadvantages with the prior heavy lifting apparatus and method, the present invention envisages a crane apparatus for lifting a load from a base region of a tower to an elevated region of the tower, the crane apparatus comprising crane-lifting means for lifting the crane apparatus to a crane mounting position on the tower using one or more crane-lifting cables supported at the elevated region of the tower, two boom arms adapted to be displaced outward from the elevated region of the tower, a distal region of each boom arm being provided with cable supporting means for supporting one or more load-lifting cables, a boom support frame for supporting the boom arms such that the boom arms can be arranged on either side of the tower during said lifting of the crane apparatus to the crane mounting position, and/or such that the boom arms can be arranged on either side of the load during the lifting of the load, load-lifting means supported at the distal region of one or both boom arms, the load-lifting means being for lifting the load to the elevated region using the one or more load-lifting cables.

Incorporating the crane-lifting means into the crane apparatus itself allows the crane to lift itself up the tower to its installation point without the necessity for long cables and winches operated from ground level, for example. By providing the load-lifting means on the boom arms of the crane apparatus, the main load-lifting operation can similarly be performed without the need for long cables and winches operated from ground level. The crane can thus be assembled at the base of the tower and lift itself up to the top autonomously, where it can be mounted and deployed without significant intervention from ground level, and where it can perform the load-lifting operation without significant intervention from ground level. Thus, the crane apparatus of the invention can operate more independently of ground-level personnel and equipment, which means that its deployment can be made substantially independent of the height of the tower.

According to a variant of the crane apparatus of the invention, the load-lifting means may comprise one or more first strand jacks arranged for exerting a pulling action on the load-lifting cables, and/or the crane-lifting means may comprise one or more second strand jacks arranged for exerting a pulling action on the crane-lifting cables. Strand jacks have a very high load-lifting capacity in relation their own size and weight, and their use therefore enables the overall weight of the crane apparatus to be kept to a minimum, or the overall lifting capacity of the crane apparatus to be maximized.

According to another variant of the crane apparatus of the invention, the boom support frame comprises boom displacement means for displacing the boom arms relative to said boom support frame, between a retracted state and a deployed state. In this way, relatively long boom arms can be kept safely stowed during lifting, in order to reduce the dimensions of the crane apparatus.

According to another variant of the crane apparatus of the invention, the boom arms, the boom support frame and the one or more second strand jacks are mutually arranged such that, when the boom arms are in their retracted state during said lifting of the crane apparatus, the centre of gravity of the crane apparatus is below the points of action of said one or more second strand jacks on said crane-lifting cables. This can help to stabilize the crane apparatus as it travels up or down the tower.

According to another variant of the crane apparatus of the invention, the boom support frame comprises boom arm pivot means for pivoting the boom arms relative to the boom support frame during lifting of the load and/or during installation of the load at the elevated region. This allows the frame of the crane apparatus to be maintained steady, in a substantially static position at the top of the tower, while the load is moved inwards towards the tower, or outwards from the tower, by pivoting the booms relative to the boom support frame, instead of pivoting the whole crane apparatus, as was required in the prior art crane arrangement.

According to another variant of the crane apparatus of the invention, the boom support frame comprises two jib-frames linked by at least one cross-member, the jib-frames and the or each cross-member being arranged such that the crane apparatus can be assembled straddling the tower with one jib-frame on either side of the tower.

According to another variant of the crane apparatus of the invention, the boom support frame comprises separation adjusting means for varying a separation distance between the two jib-frames as the crane apparatus travels up or down the tower.

According to another variant of the crane apparatus of the invention, the boom support frame and/or one or both of the boom arms comprise at least one load-lifting cable take-up means for storing the or each load-lifting cable, or a part of the or each heavy lifting cable not under tension from the or each load-lifting means.

According to another variant of the crane apparatus of the invention, the boom support frame comprises frame pivot means for engaging with tower pivot means provided at the crane mounting point of the tower to form a first pivot axis about which the boom support frame can be pivoted, the crane apparatus further comprising at least one pivot actuator for causing the boom support frame to pivot about the first pivot axis.

According to another variant of the crane apparatus of the invention, the or each first strand jack is secured to the distal region of one of the boom arms, and the heavy lifting cables are vertically displaceable relative to the boom support frame by means of the pulling action of the or each first strand jack, such that the load can be lifted by pulling up, or lowered by lowering, the load-lifting cables using the one or more first strand jacks.

According to another variant of the crane apparatus of the invention, one or more of the one or more first strand jacks are arranged as climbing jacks, securable to the load such that the load can be lifted by means of the one or more climbing jacks climbing up or down the heavy lifting cables.

According to another variant of the crane apparatus of the invention, the crane apparatus comprises load counterbalancing means for counterbalancing the weight of the load, the load counterbalancing means being arranged to exert a pulling force between a rear region of the crane apparatus and the base region or a lower region of the tower, the rear region being a region of the crane apparatus on the opposite side of the tower from the load being lifted.

The invention also envisages a method of lifting a load to an elevated region of a tower, the method including:

a crane-lifting step, in which a crane apparatus is raised to a crane mounting position on the tower, the crane apparatus comprising boom support means and two boom arms, one or both of the boom arms being provided with load-lifting means at a distal end of the boom arm, the crane apparatus further comprising load-lifting cable support means for supporting load-lifting cables during the crane lifting step, the crane-lifting step being accomplished using crane-lifting means of the crane apparatus acting on crane-lifting cables supported at an upper region of the tower, a mounting step, in which the crane apparatus is mounted at the crane mounting position of the tower, a boom arm deployment step, in which the boom arms are displaced relative to the boom support frame from a retracted state relative to the boom support frame to a deployed state, a load-lifting step, in which the load is lifted using the load-lifting means.

According to a variant of the method of the invention, the method may include a tower preparation step, performed before the crane-lifting step, in which a bracket assembly is fitted to the elevated region of the tower, the bracket assembly comprising crane-lifting cable support means for supporting the crane-lifting cables during the crane-lifting step.

According to another variant of the method of the invention, the load-lifting step may comprise using one or more first strand jacks to pull on the load-lifting cables, and/or the crane-lifting step may comprise using one or more second strand jacks to pull on the crane-lifting cables.

The invention will now be described with reference to the attached drawings, in which:

FIG. 17 shows in perspective view a boom arm deployment operation of the crane apparatus.

FIGS. 19 and 20 show in side elevation view a main load-lifting stage of a method of the invention.

FIGS. 23 to 26 show in side elevation view a further load-lifting stage of a method according to the invention.

The crane apparatus and lifting method of the invention will now be described in more detail with reference to FIGS. 1 to 26. Note that the drawings are provided for explanatory purposes only, and are intended merely to indicate an example of how the invention can be realized. The drawings should not be taken as limiting the scope of protection, which is set out in the accompanying claims. The use of the same reference numbers in different drawings is intended to indicate that the references refer to the same features.

As mentioned above, FIGS. 1 to 26 describe an exemplary implementation of a method and apparatus according to the invention. The illustrated technique comprises essentially five main stages:

a preparation stage (FIGS. 1 to 4), in which a relatively light bracket assembly (weighing perhaps a few tonnes), is installed at the top of the tower, a crane assembly stage (FIGS. 5 to 6), in which a crane apparatus (weighing perhaps a few tens of tonnes, depending on the weight of the load to be lifted) is assembled around the base of the tower, a crane lifting stage (FIGS. 7 to 14), in which the assembled crane apparatus is lifted up the tower using cables attached to the bracket assembly, a crane apparatus deployment stage (FIGS. 15 to 18), in which the various parts of the crane apparatus are deployed ready for lifting the load, a load-lifting stage (FIGS. 19 to 26), in which the crane apparatus is used to lift a generator unit (weighing perhaps 400 tonnes) for installation at the top of the tower. Further load lifting stages may include lifting the turbine blades, for example.

It will be understood that the stages described here can also be performed in reverse in order to lower the load and the crane from the top of the tower. The term "lifting" is thus to be understood in the sense of either "lifting up" or "lifting down".

Note that the implementation described is given by way of example only, and the method and apparatus could be implemented in other ways. For example, the technique is described as lifting a turbine generator to the top of a tower, but the method could also be used for lifting any large load to an elevated region on any tall structure. The tower may typically be a reinforced concrete structure, or may also be constructed of other materials such as metal or a composite material.

The term "cable" is used here to refer to any strong, elongated element such as a rope, wire, strand or bundle of strands, which can be used for example for lifting a heavy load such as a wind-turbine generator unit weight several hundred tons.

Preparation Stage

Figure 1:
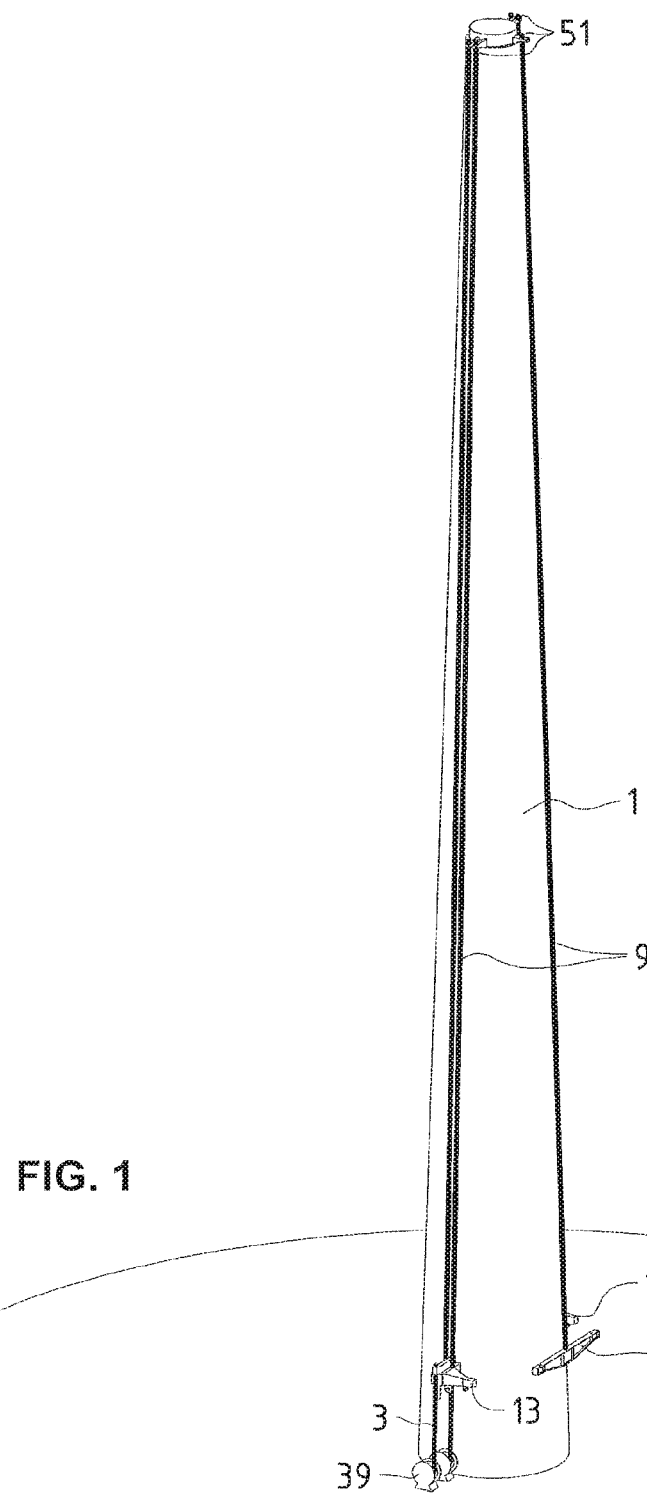
FIG. 1 shows in perspective view a tower for a wind-turbine, and a preparation stage for a heavy lifting method according to the invention.
Figure 2A:
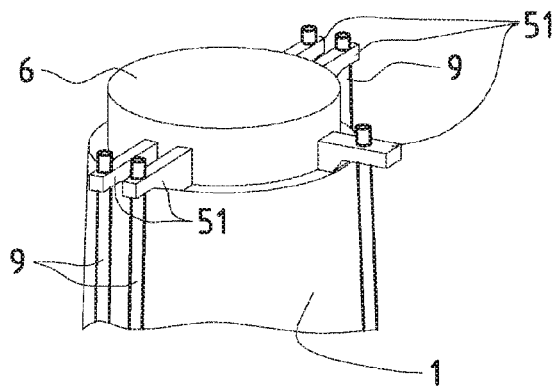
FIGS. 2a and 2b show in perspective more detailed close-up views of the top and base, respectively, of the tower illustrated in FIG. 1.

FIG. 1, and the enlarged illustration in FIG. 2a, illustrate a tower which has been constructed with a set of attachment points 51 at the top. Such attachment points 51 may be used for attaching or supporting light-lifting cables 9, suitable for lifting relatively light items, for example weighing no more than a few tonnes. A winch (not shown), for example mounted at the top of the tower or at the base of the tower, may be used to lift or lower equipment by pulling up or lowering down each of the light-lifting cables.

Figure 2B:
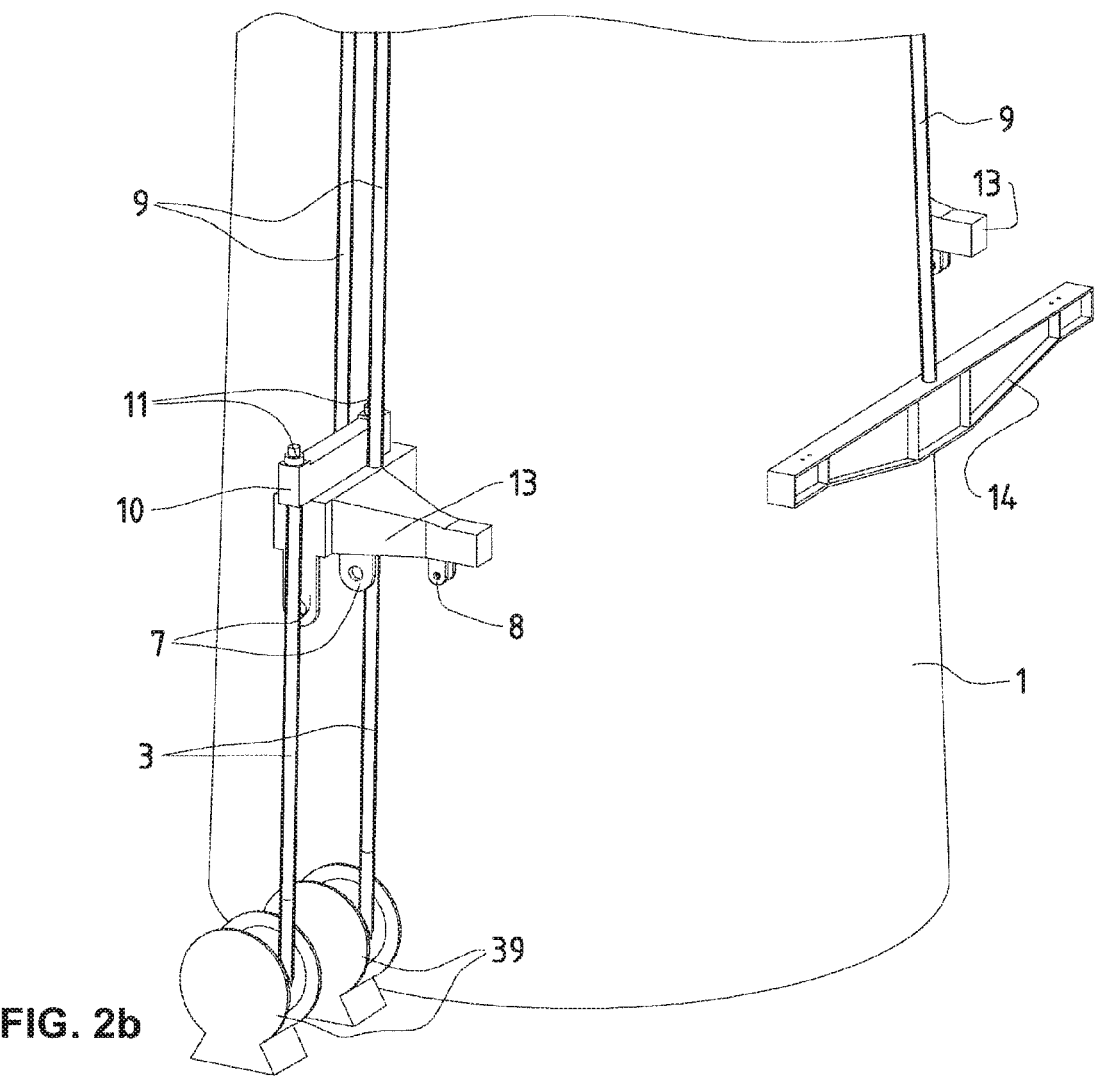

FIG. 1, and the enlarged illustration in FIG. 2b, also show elements 13, 14 of a bracket assembly being lifted up the tower 1 using the light-lifting cables 9. The bracket assembly will be described in more detail with reference to FIGS. 4a to 4c.

The bracket assembly load-bearing elements 13 are shown with crane-lifting cables 3 attached. The crane-lifting cables 3 can be unwound from reels 39 as the load-bearing elements are lifted up the tower 1.

FIG. 2b shows how two load-bearing bracket elements 13 and a connecting spreader beam 14, which can be assembled together to form a bracket assembly at the top of the tower 1, can be suspended from light-lifting cables 9 and hoisted into position near the top of the tower 1. Each of the illustrated load-bearing bracket elements 13 comprises, in addition to its main body 13, an upper crane-lifting bracket part 10, from which are suspended the crane-lifting cables 3, held in place in the illustrated example by cable anchoring elements 11.

Figure 3A:
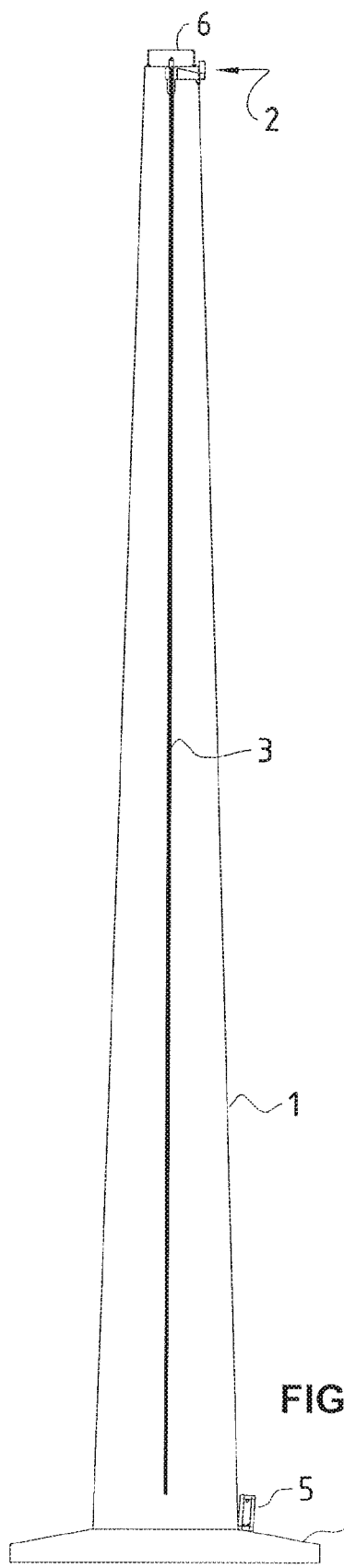
FIGS. 3a and 3b show in side and front elevation view, respectively, a wind-turbine tower with the preparation stage completed, ready for the crane-lifting stage.
Figure 3B:
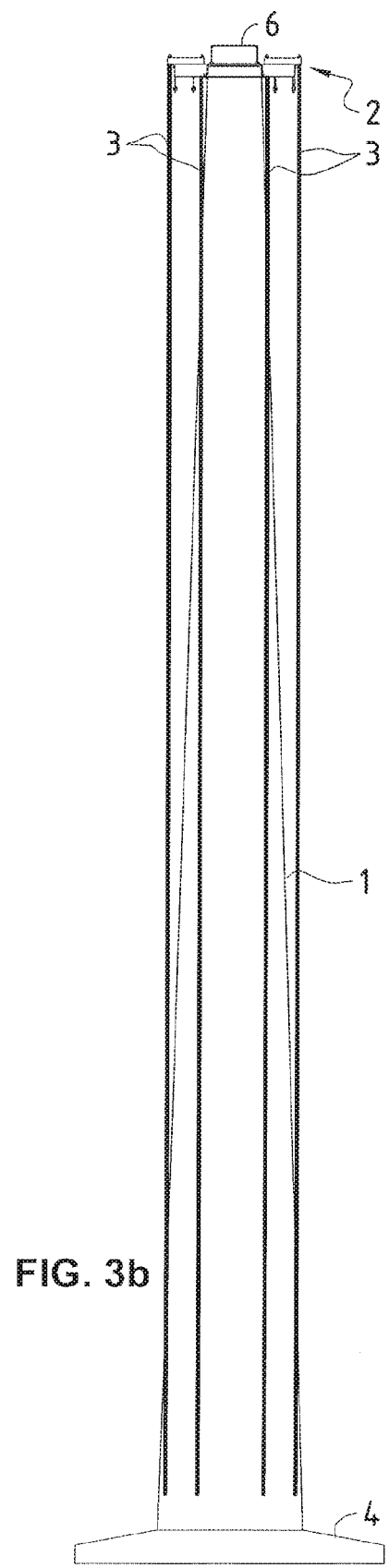
Figure 4A:
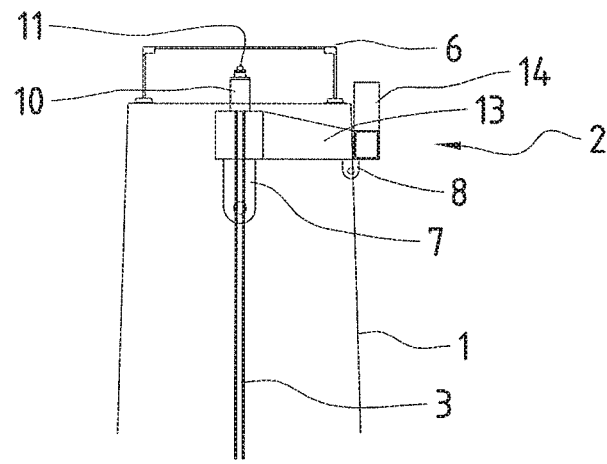
FIGS. 4a to 4c show in side elevation, front elevation and plan views respectively, enlarged illustrations of the top of the tower shown in FIGS. 3a and 3b.
Figure 4B:
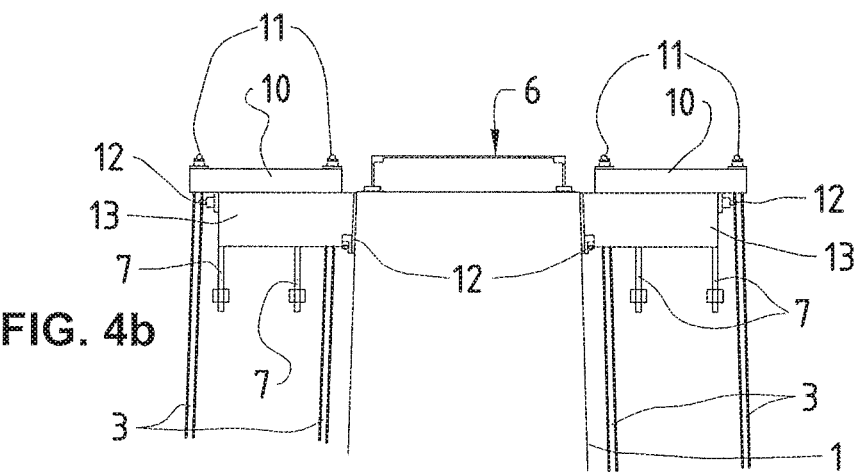
Figure 4C:
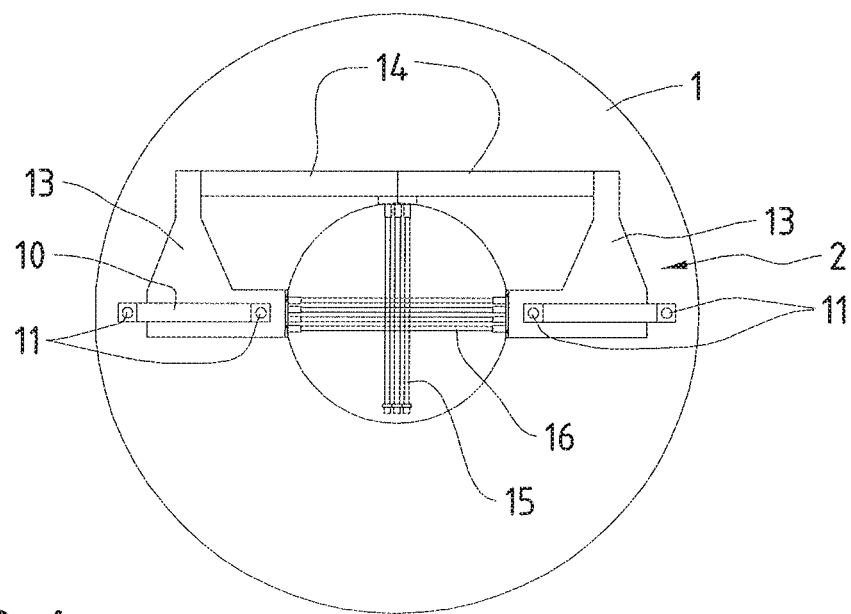

FIGS. 3a and 3b show in side and front elevation view respectively the example wind-turbine tower 1 with the first lifting stage completed. FIGS. 4a to 4c show enlarged side and front elevations and a plan view of the top of the tower shown in FIGS. 3a and 3b.

Load-bearing bracket elements 13 are shown mounted one either side of the top of the tower 1, and may be secured to each other and to the tower for example by high tensile threaded rods or anchored tendons 12, 16. A stabilizing spreader beam 14 may be connected between the load-bearing bracket elements 13 in order to give strength and rigidity to the bracket assembly, which is denoted by the reference 2. Each load-bearing bracket element 13 is provided with one or more (two are shown) crane attachment points 7. When the crane apparatus is lifted into position, it will be pivotably secured to the crane attachment points 7, as will be described.

Load-bearing bracket elements 13 are designed so that they can support the weight of the crane apparatus during the crane-lifting stage, and that they can support the weight of the crane and the weight of the load during the load-lifting stage. For this reason, it is preferable that the load-bearing bracket elements 13 are adequately secured to the top of the tower 1, one either side, with their crane attachment points 7 positioned such that the vertical load forces of the weight of crane and load are transferred to the tower 1 substantially in the middle of the tower 1.

The reference numeral 6 denotes a generator attachment fitting, on to which the wind turbine generator will later be installed. Reference numeral 5 indicates a cable anchor, which can later be used for securing a counterbalancing cable during the main load-lifting phase. The cable anchor 5 is depicted as being secured to the base or foundation of the tower. In the case of a marine installation, for example a wind-turbine tower in the sea, the cable anchor 5 could be fitted at an appropriate point above the tower base, and above sea level.

As can be seen in FIG. 3b, the crane-lifting cables 3 can be arranged in pairs for extra strength and stability during the lifting of the crane apparatus. FIGS. 3a, 3b and 4a to 4c show the tower 1 at completion of the preparation stage, ready for the crane-installation stage.

Crane Assembly Stage

Figure 5:
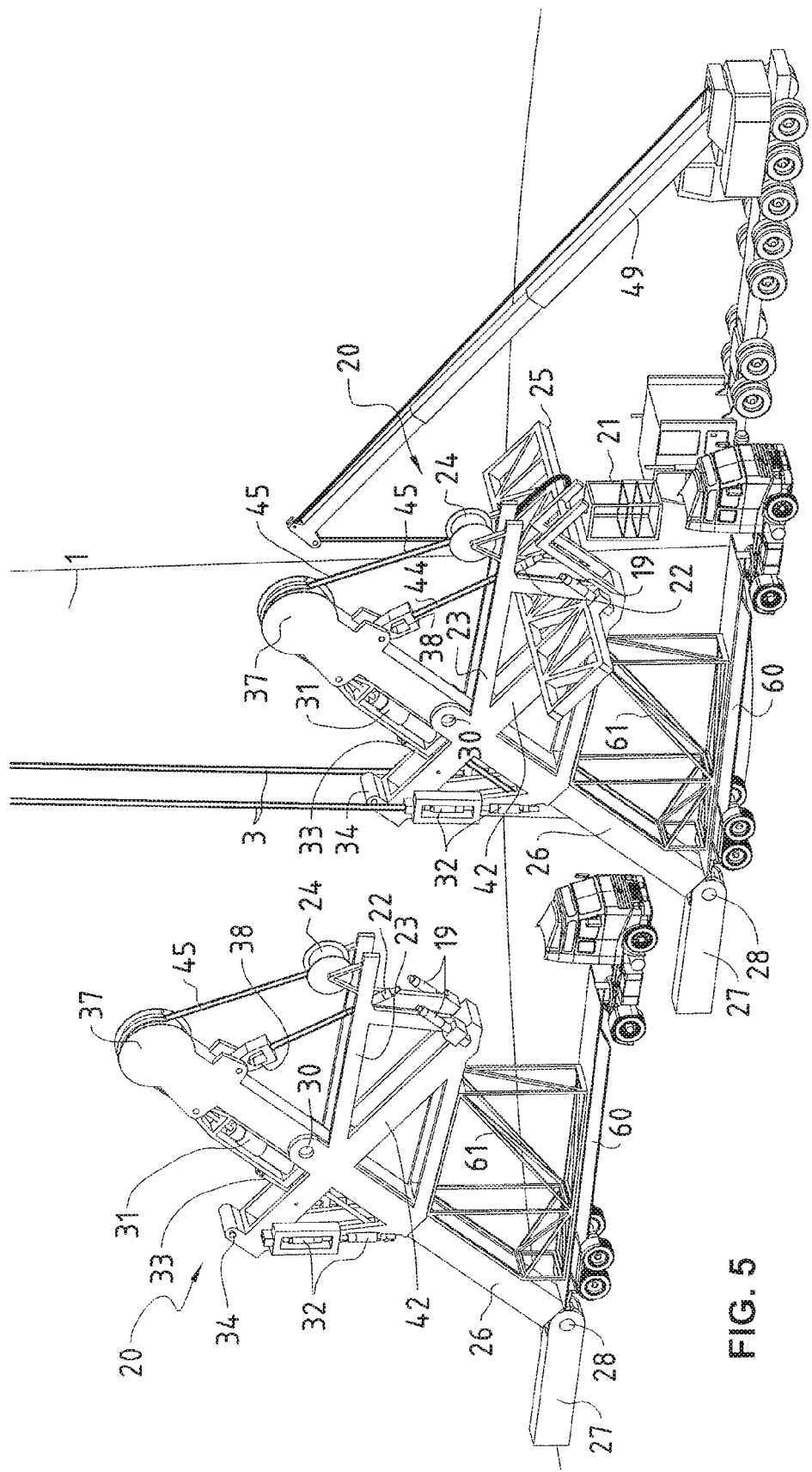
FIG. 5 shows in perspective view a schematic illustration of how a crane apparatus according to the invention can be delivered and assembled at the base of a tower.

FIG. 5 shows in perspective view a schematic illustration of how a crane apparatus according to the invention can be delivered and assembled at the base of the tower 1. In the example shown, two lorries, equipped with support frames 61, are each delivering a jib-frame assembly 20, which will be connected to each other by cross-member 25 to form the crane apparatus which will then be lifted up the tower using crane-lifting cables 3. Regular crane 49 is shown supporting cross-member 25 during the assembly of the crane apparatus. The tower 1 is shown as having a tapering form, with a wider cross-section at its base than at the top. Cross-member 25 is thus constructed to be long enough to connect the two jib-frames 20 together, with one jib-frame 20 at either side of the tower 1. As the crane apparatus proceeds up the tower, the jib-frames 20 and the cross-member can be adjusted so that the jib-frames 20 come closer together.

Each jib-frame 20 comprises a main frame part 42 and a boom arm 26, 27. In the example shown, the boom arm 26, 27 is provided with a pivot point 28 part-way along its length. As will be seen later, this allows boom arm 26, 27 to be raised through the main frame part 42 until the lower part 27 of the boom arm 26, 27 is in a corresponding boom-holding section of the main frame, with its pivot point 28 aligned with a corresponding pivot 30 in the main frame part. A pivot pin (not shown) can then be used to join the pivot point 28 of the boom arm 26, 27 with the pivot 30 of the main frame part, to create a load-bearing pivot axis about which the boom arm 26, 27 can be pivoted, even when the boom arm 26, 27 is supporting a heavy load such as a wind turbine generator.

Figure 6:
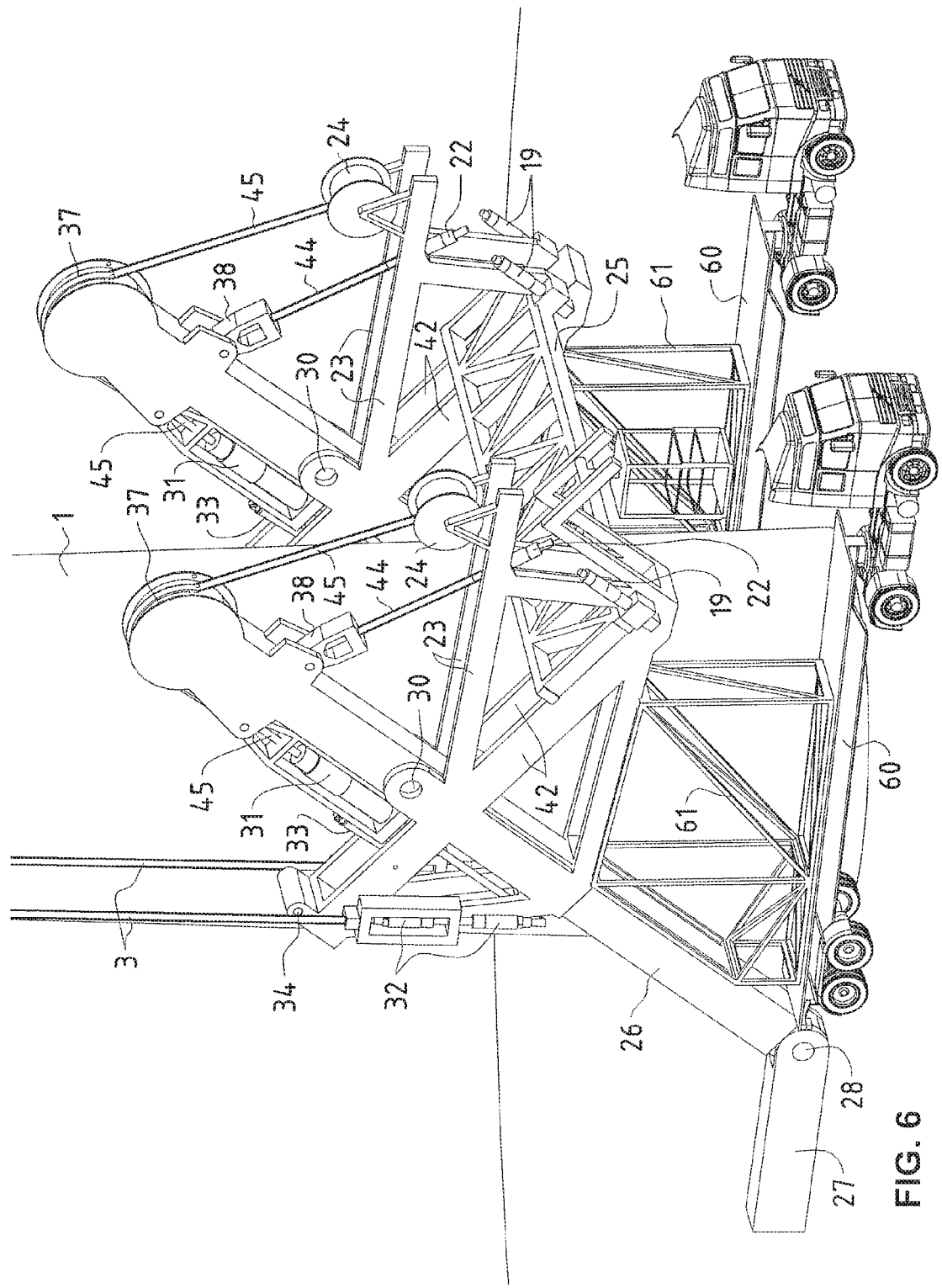
FIG. 6 shows in perspective view a schematic illustration of how the crane apparatus of FIG. 5 in its assembled state, ready for the crane-lifting stage.
Figure 7:
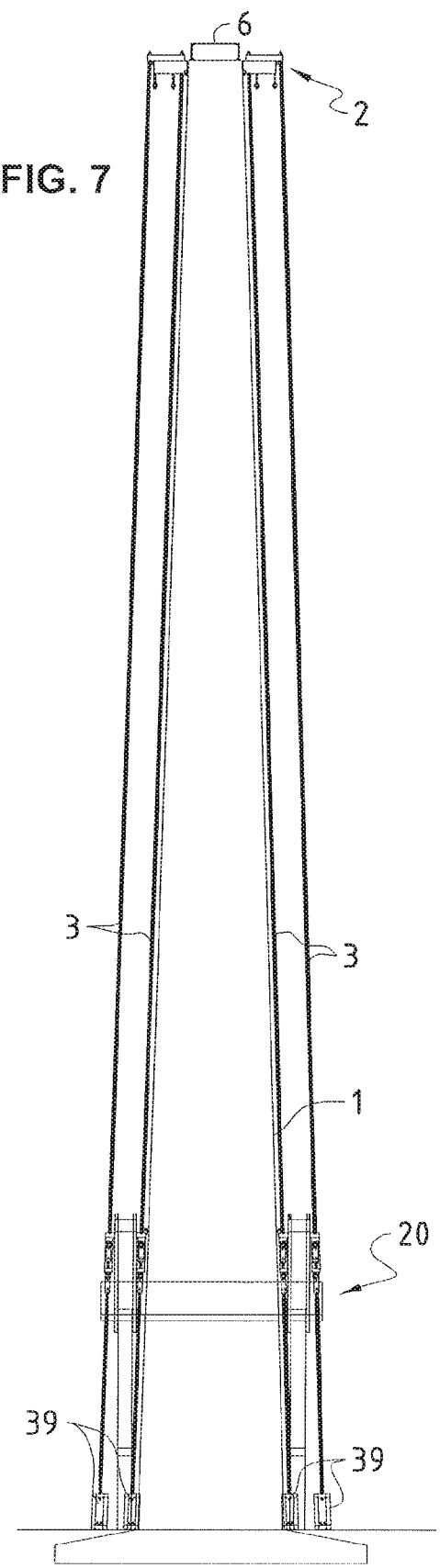
FIG. 7 shows in front elevation view a schematic illustration of a tower, and an assembled crane apparatus, ready for the crane-installation stage.

FIG. 6 shows the jib-frames 20, still supported by the lorries 60 and support frames 61, with the jib-frames assembled together with the cross-member 25 to form the crane apparatus which will be lifted up the tower 1. In this example, each jib-frame 20 is shown equipped with two reciprocating crawler jacks 32, which can be operated so that the jib-frames self-climb up the crane-lifting cables 3. The use of two cooperating, crawler jacks 32 operating with alternate lifting cycles, enables a substantially continuous lifting motion of the crane apparatus up the crane-lifting cables. It is also possible for the jacks 32 to be mounted at the top of the tower, and to haul up the crane by hauling the crane-lifting cables 3. Winches may alternatively be used, mounted on the jib-frames 20. However, strand-jacks are preferred, because they are comparatively smaller, and because they offer a significantly greater lifting-force-to-weight-ratio, than winches. Or winches may be mounted at the top of the tower, or at the base of the tower, in which case a pulley arrangement will be required at the top of the tower. By arranging the jacks 32 on the crane apparatus, however, the lifting can be considerably simplified, and the crane apparatus can lift itself autonomously up the tower 1.

The crane apparatus of the example is also autonomous in that it includes heavy-lifting cables 45, installed and in position for subsequent lifting of the main load (the turbine generator unit, for example). The crane apparatus can also include the heavy lifting jacks 31 which will act on the heavy-lifting cables 45 in order to haul the load up the tower. To this end, each jib-frame 20 of the illustrated example can be provided with a take-up reel 24 for storing the heavy-lifting cables when not being used for lifting, or for winding on cable during the lifting operation. In the example arrangement, the part of each heavy-lifting cable 45 which is not under tension during the load lifting passes around a guide or pulley arrangement 37 and can then be wound on to or off the reel 24.

Jacks 22 are also provided for exerting a pulling force between jib-frame members 23 and the corresponding boom arms 26 by means of boom pivot cables 44. As will be shown, these jacks 22 can be used to pivot the boom arm 26 in order to move the load inwards towards or outwards away from the tower 1. Pivotable connecting parts 38 can be used to connect the boom pivot cables 44 to the boom arms 26.

Each jib-frame is also provided with jacks 19 which can be used during load-lifting to counterbalance the weight of the load during load-lifting by means of a cable (not shown) running between the counterbalance jacks 19 and the tower base, or a lower point on the tower 1.

Reference numerals 33 in FIG. 6 indicate actuators such as hydraulic rams for pivoting the crane apparatus during installation at the top of the tower 1. Reference numerals 34 indicate pivot points where the crane apparatus will be pivotably connected to the bracket assembly 2 at the top of the tower.

Crane Lifting Stage

FIGS. 7 to 10 show various views of the assembled crane apparatus suspended from crane-lifting cables 3, ready to begin moving up the tower 1. Crane lifting cables 3 are shown anchored at fixing points 39. The crane lifting cables 3 are preferably tensioned during the lifting of the crane apparatus, such that also the part of the crane-lifting cables below the self-climbing jacks is also held under tension. Because the full height of the cable-lifting cables 3 is under tension, they give significant guiding and stability, preventing the crane apparatus from significant lateral movement during the self-climbing operation. Additional guidance can be provided, if necessary to resist unusually high winds, for example, by rails or similar guiding means provided on the outer surface of the tower 1.

In FIGS. 7 to 10, the jib-frames 20 and the cross-member 25 are illustrated as having a mutual separation distance which gives adequate clearance to the tower structure 1. Jib-frames 20 can be brought closer together as the crane apparatus proceeds up the tower 1.

Figure 8:
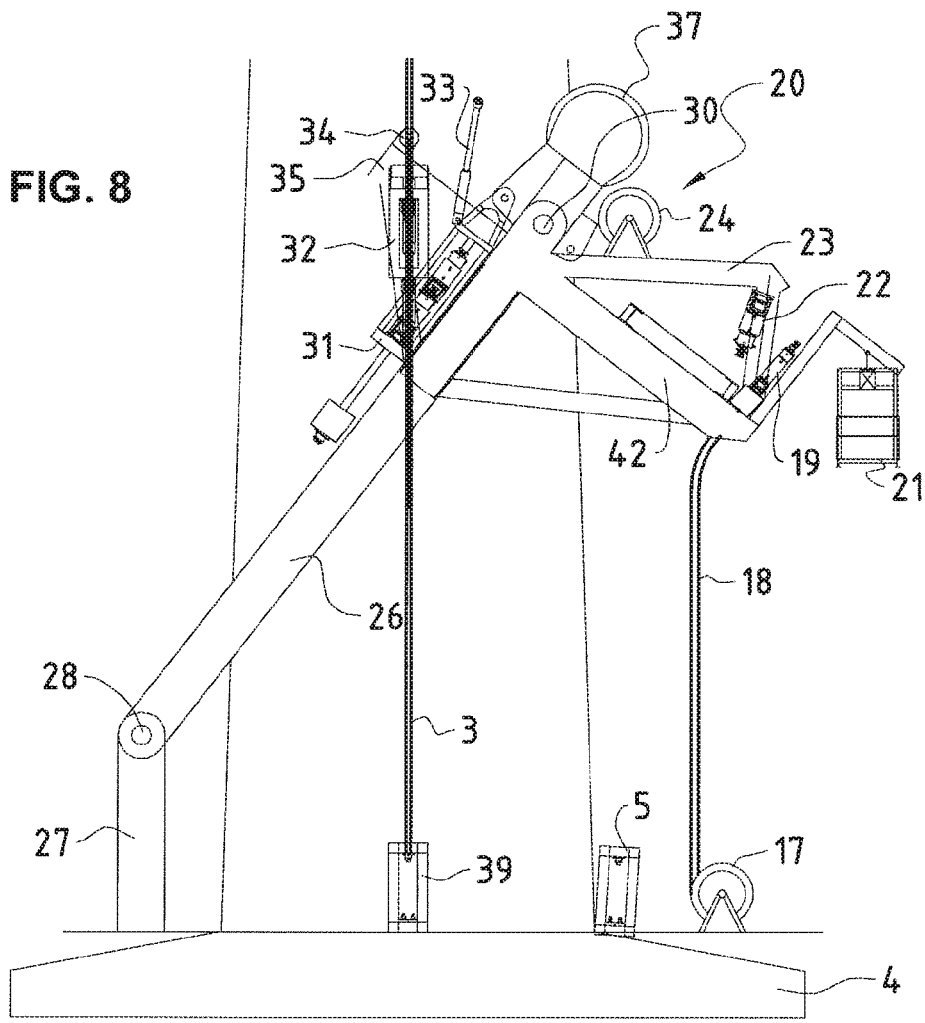
FIGS. 8 and 9 show side elevation and plan views, respectively, of the crane apparatus shown in FIG. 7.
Figure 9:
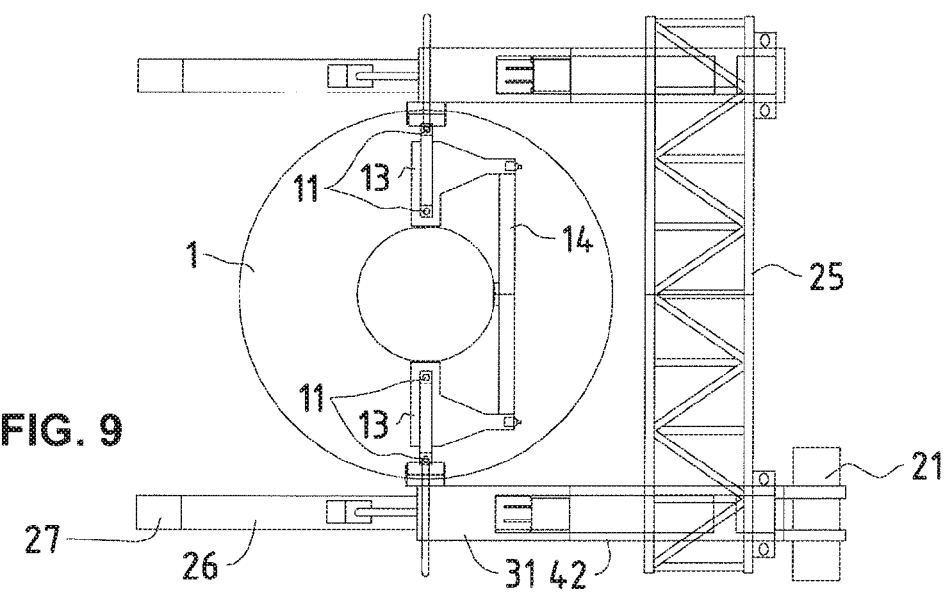
Figure 10:
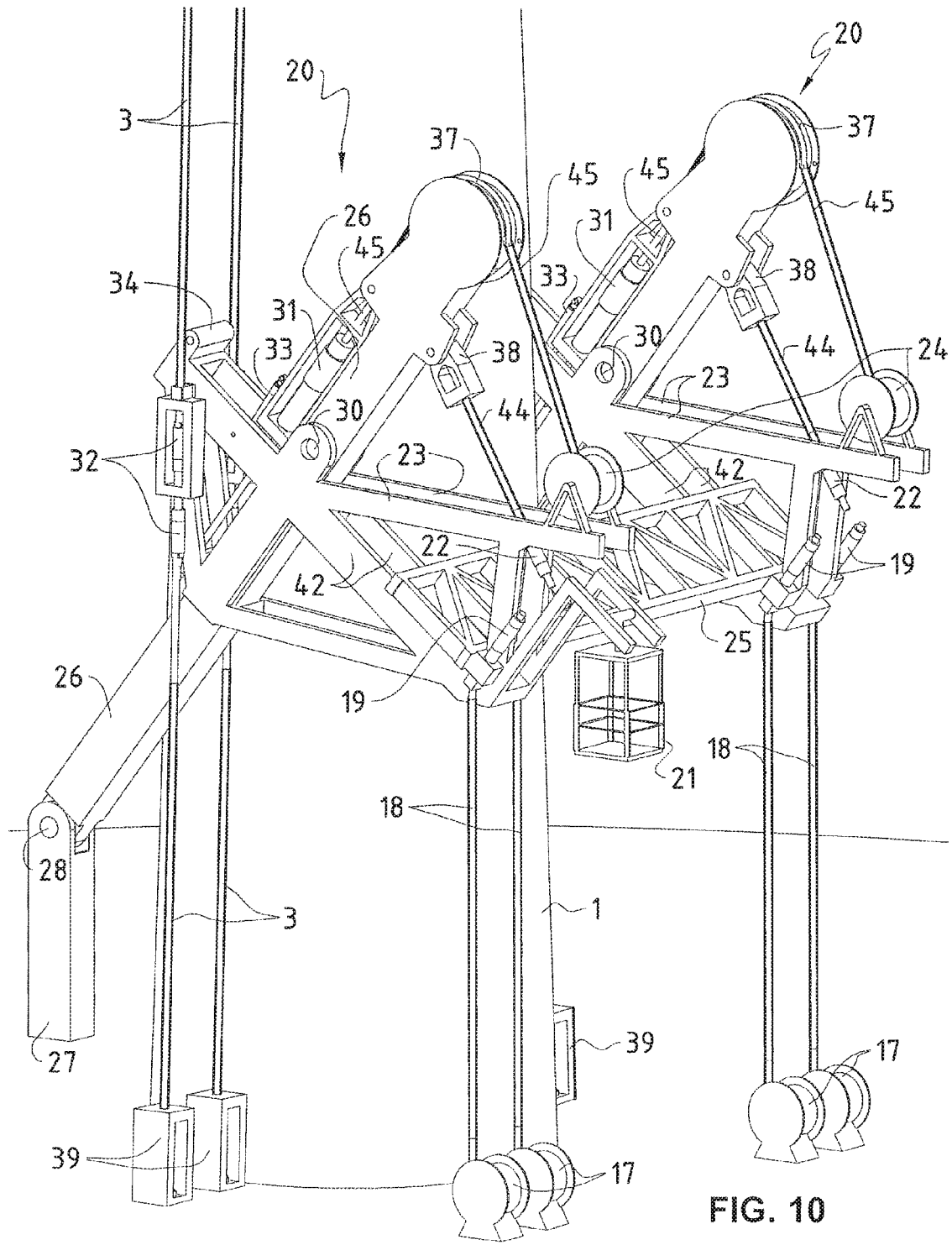
FIG. 10 shows a perspective view of the crane apparatus of FIG. 6 at the beginning of the crane-installation stage.
Figure 11:
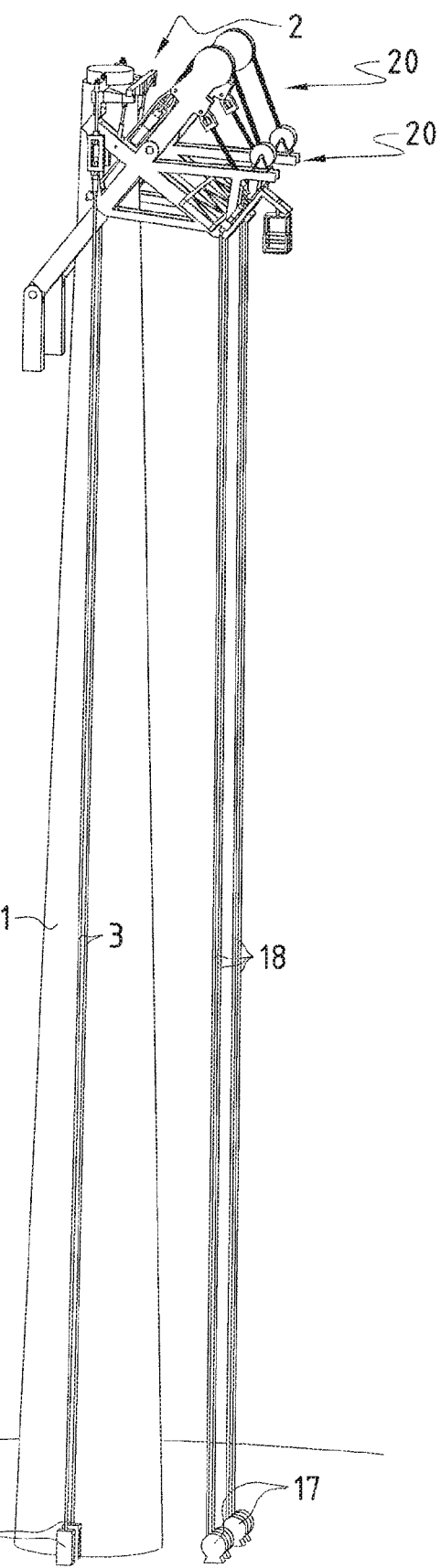
FIG. 11 shows a perspective view of the tower and crane apparatus of FIGS. 6 and 10 at the completion of the crane-installation stage.
Figure 12:
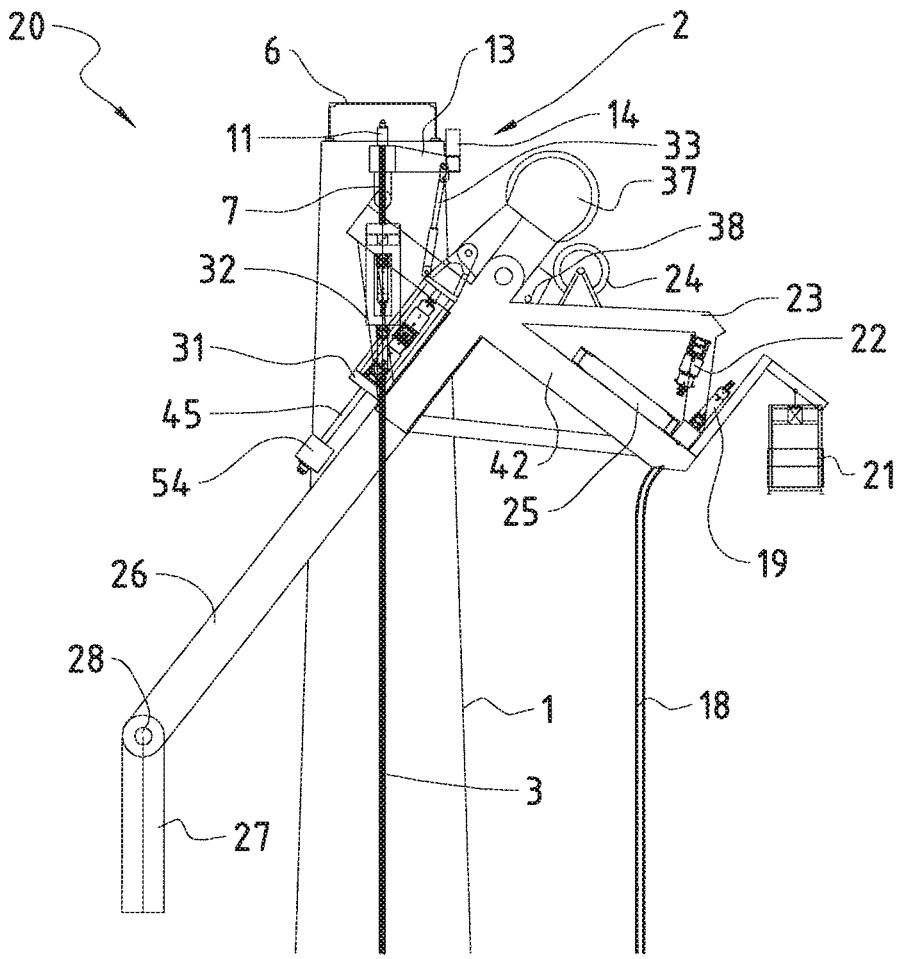
FIGS. 12 and 13 show side elevation and plan views, respectively, of the crane apparatus shown in FIG. 11.

FIG. 8 also shows a personnel lift 21 arranged at the rear region of the crane assembly. The lift cage 21 can be used to accommodate one or more crane apparatus operators during the crane lifting and installation stages, and during the subsequent lifting stages. A winch (not shown) or similar device can be used for raising or lowering the operator(s) up and down from the ground.

FIG. 8 also shows one or more counterbalance cables 18 being unwound from one or more counterbalance cable reels 17 as the crane apparatus is lifted. Once the crane apparatus is in position at the top of the tower 1, the counterbalance cables 18 will be secured to anchor point(s) 5 at the base 4 of the tower 1 (the anchor point(s) 5 may be provided at any suitable anchor point below the installed crane apparatus).

Once the crane apparatus reaches the top of the tower, it preferably already comprises substantially all the equipment necessary for installing the crane apparatus, deploying the boom arms and lifting the load, without the need for lifting any further significant equipment, cables, jacks etc from the ground.

FIGS. 7 to 10 also show how the lower part 27 of each boom arm 26 can hang down during lifting. The boom arms 26, 27 represent a significant proportion of the weight of the crane apparatus, and they are arranged in a retracted state, as illustrated, during lifting of the crane apparatus. In this way, the centre of gravity of each jib-frame 20, and the crane apparatus as a whole, can be arranged to be significantly below the points at which the climbing jacks 32 of the crane apparatus grip the crane lifting cables 3. This low weight distribution means that the crane apparatus is significantly more stable during lifting. It is of course undesirable that a large, very heavy structure such as a crane apparatus should start to swing around 150 m above the ground. Its low centre of gravity, together with the tension in the crane lifting cables 3, helps to prevent such undesirable oscillations. Counterbalance cables 18 can also be used as control means to stablise the crane apparatus during lifting, by preventing it from swinging.

FIGS. 11 to 14 show the crane apparatus (jib-frames 20) as they approach the bracket assembly 2 at the top of the tower 1. Crane-lifting cables 3 are still under tension between the bracket assembly 2 and the anchor elements 39, and are supporting the weight of the crane apparatus. Counterbalance/control cables 18 are still being unwound off reels 17, and may also be used to stabilize the crane apparatus while it is suspended on the crane-lifting cables 3 by the climbing crawler-jacks 32 as described previously.

Figure 13:
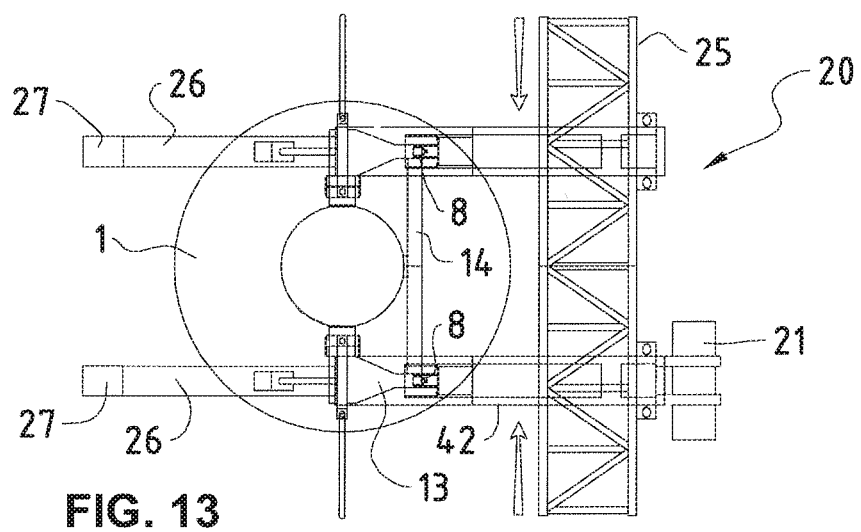
Figure 14:
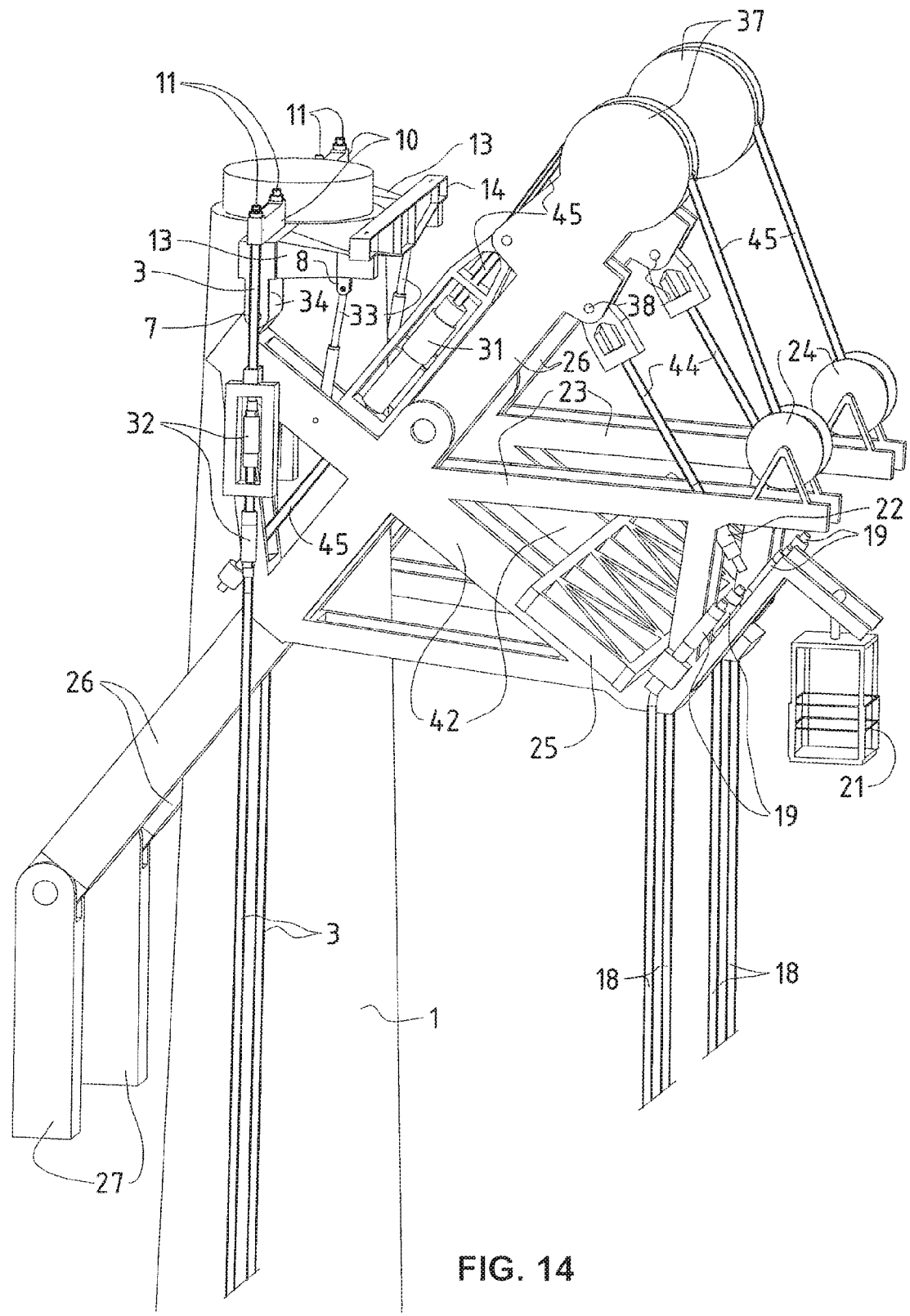
FIG. 14 shows in enlarged perspective view the crane apparatus depicted in FIG. 11.

As can be seen from FIG. 13 (in comparison with FIG. 9), the jib-frames 20 are illustrated displaced towards each other to take into account the tapering of the tower 1, and are now depicted as aligned with the support bracket elements 13 of bracket assembly 2. As shown in FIG. 14, this displacement has brought the pivot means 34 of each jib-frame 20 into alignment with corresponding crane attachment points 7, and can be pivotably secured such that the weight of the crane apparatus is supported by the support bracket 13 while the crane apparatus is deployed. Pivot actuator 33, which may for example be a hydraulic ram, is attached to a pivot actuator point 8 on the bracket assembly 2, and will be used to effect the pivoting of the crane corresponding jib-frame into its lifting position, as will be described with reference to FIGS. 15 to 18.

Crane Deployment Stage

Figures 15, 16:
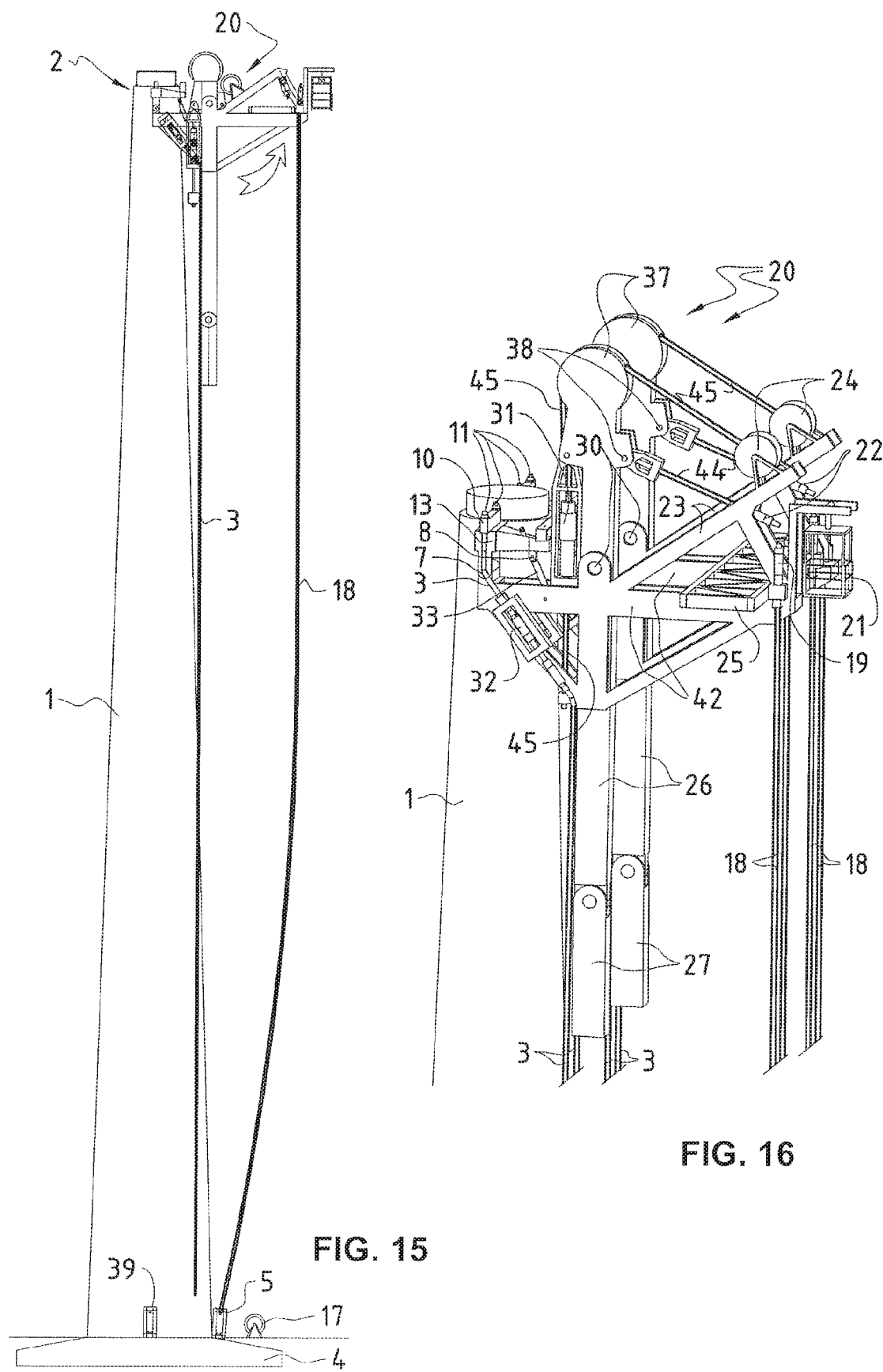
FIGS. 15 and 16 show in side elevation and perspective views respectively, a first pivoting operation of the crane apparatus at the top of the tower.

FIGS. 15 and 16 show the crane apparatus now supported by the bracket assembly 2 at pivot point 7, and pivoted into its deployed position by actuator 33 by pulling on actuator connector point 8. The crane apparatus may be secured in this position while the boom arms 26 are deployed. However, the actuator 33 can maintain the crane apparatus in position. Once the load-lifting begins, the angular position of the crane apparatus will be determined by the weight of the load being lifted and by the counterbalance/control cables 18, and the actuator 33 will not be required to maintain the deployed position of the crane apparatus during this phase.

FIG. 15 also shows how the crane-lifting cables are now untensioned and disconnected from anchor points 39, although they may remain loosely attached in order to prevent them from swinging and damaging the tower or causing danger to personnel. Each counterbalance/control cable 18 is released from its reel 17 and attached to an anchor point 5.

FIG. 17 shows the boom arms 26, 27 having been displaced from their retracted state upwards through their respective jib-frames 20 such that pivot point 28 of each boom arm 26, 27 is aligned with the corresponding pivot 30 of the jib-frame 20, and pivotably connected by means of a pivot pin, for example. The upward displacement of the boom arms 26, 27 from their retracted state to their deployed (extended) state may be achieved by means of jacks or rams or winches, for example, which are not illustrated in the figures. At this stage the pivoting actuator 33 can be partially or wholly released, and the counterbalance/control cables 18 can be tensioned, for example by means of counterbalance/control jacks 19, to maintain the angular orientation of the jib-frame against the weight of the boom arms 26.

Figure 18:
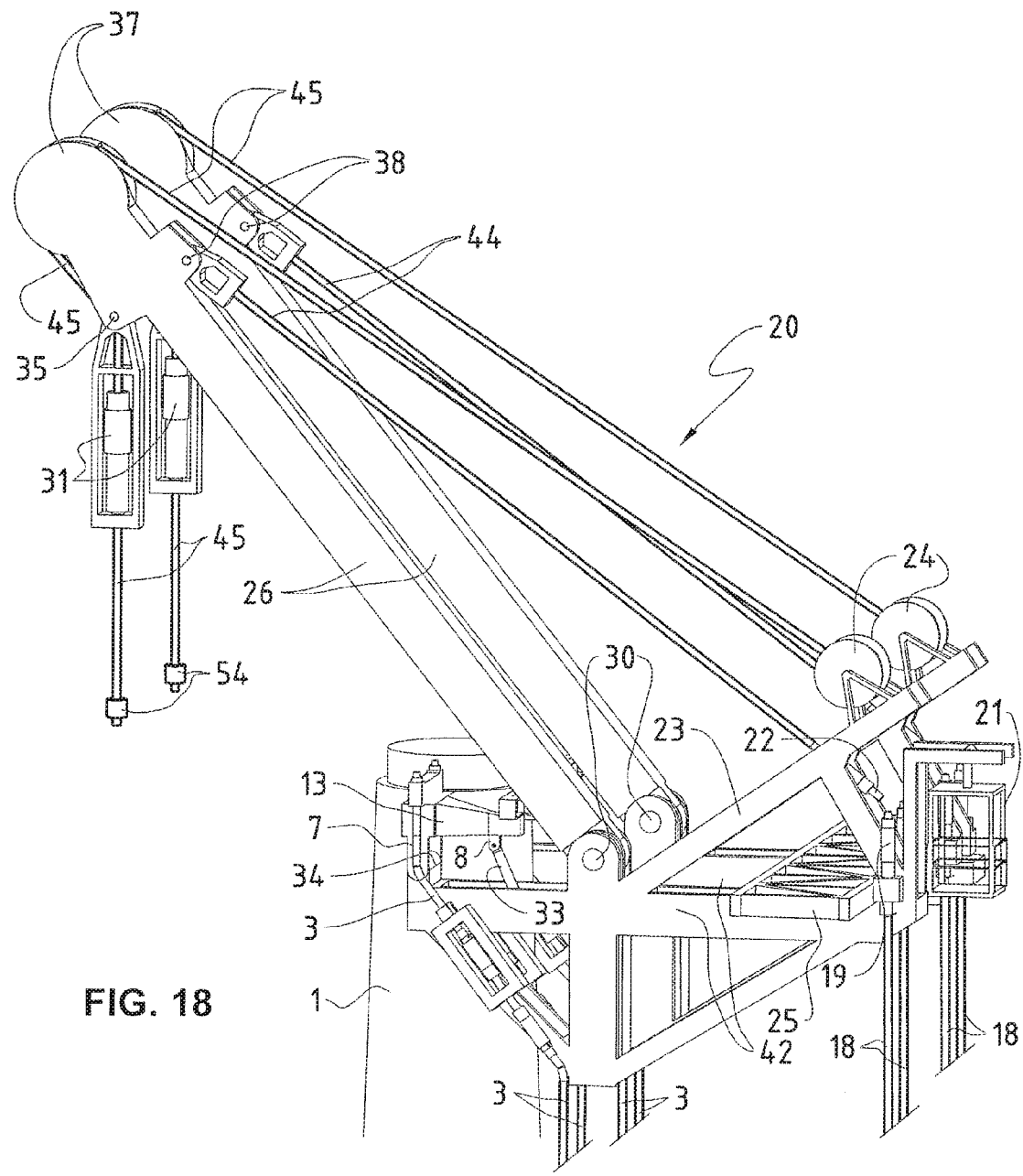
FIG. 18 shows in plan view a second pivoting operation of boom arms of the crane apparatus.

Once each boom arm 26 is in its deployed state and can pivot about pivot point 30, it can be lowered into its load-lifting position (shown in FIG. 18) by means of pivot pulling jack 22, by releasing some of pivot cable 44. Load-lifting jacks 31, which are pivotably secured to the distal end region of the boom arms 26, 27 are shown ready to begin the load-lifting stage. The load-lifting cables 45 can now be lowered and unwound off load-lifting-cable reels 24. Reels 24 may be implemented as winches for lowering the load-lifting cables quickly. Load-lifting cables 45 are shown in FIG. 18 fitted with load-securing means 54, to which the load to be lifted will be attached.

Load-Lifting Stage

FIGS. 19 to 22 show a load-lifting operation being performed using the crane apparatus already installed as described above. Load-lifting cables 45 are first lowered, for example using reels/winches 24, and attached to a turbine generator unit 46. As can be seen from FIGS. 21 and 22, a spreader beam 56 can be used, for example equipped with a load rotator 57, to attach the load 56 to the load-lifting cables 45.

Lifting force is provided by heavy-lifting jacks 31, acting on the heavy-lifting cables 45. Jacks 31 may be implemented as complementary sets (eg pairs) of pulling jacks, working with alternate or staggered lifting strokes on the same cable, so as to provide a substantially constant lifting motion of the load 46. During the lifting, the angular orientation of the jib-frames 20 may be maintained by the counterbalance/control cables 18. In this way, it is possible to ensure that the load forces on the tower 1 due to the weight of the load 46 are substantially entirely vertical, and act substantially down through the centre-line of the tower 1.

Figure 21:
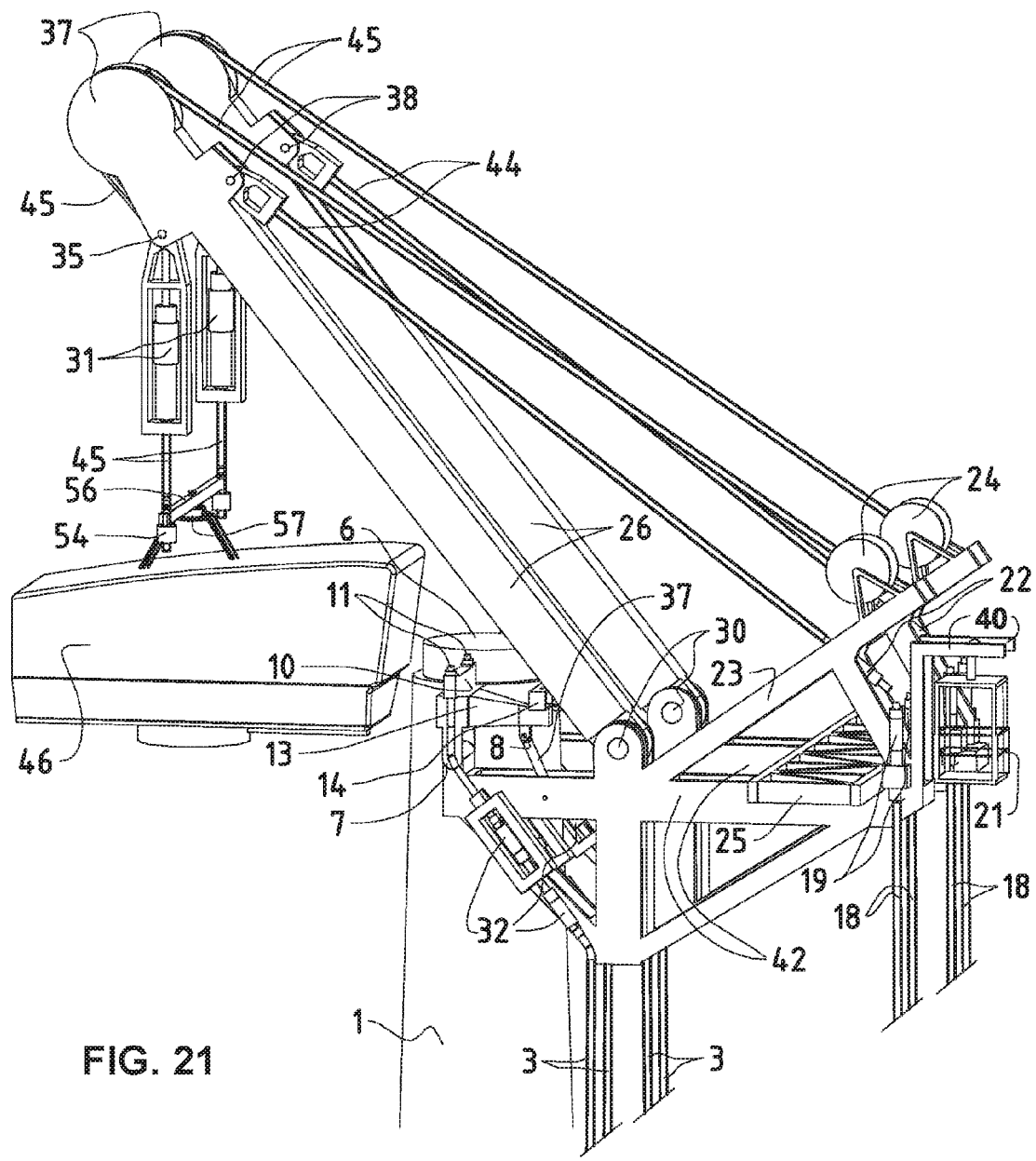
FIG. 21 shows in perspective view an enlarged detail of the crane apparatus and a rotation of a load to be installed at the top of the tower.
Figure 22:
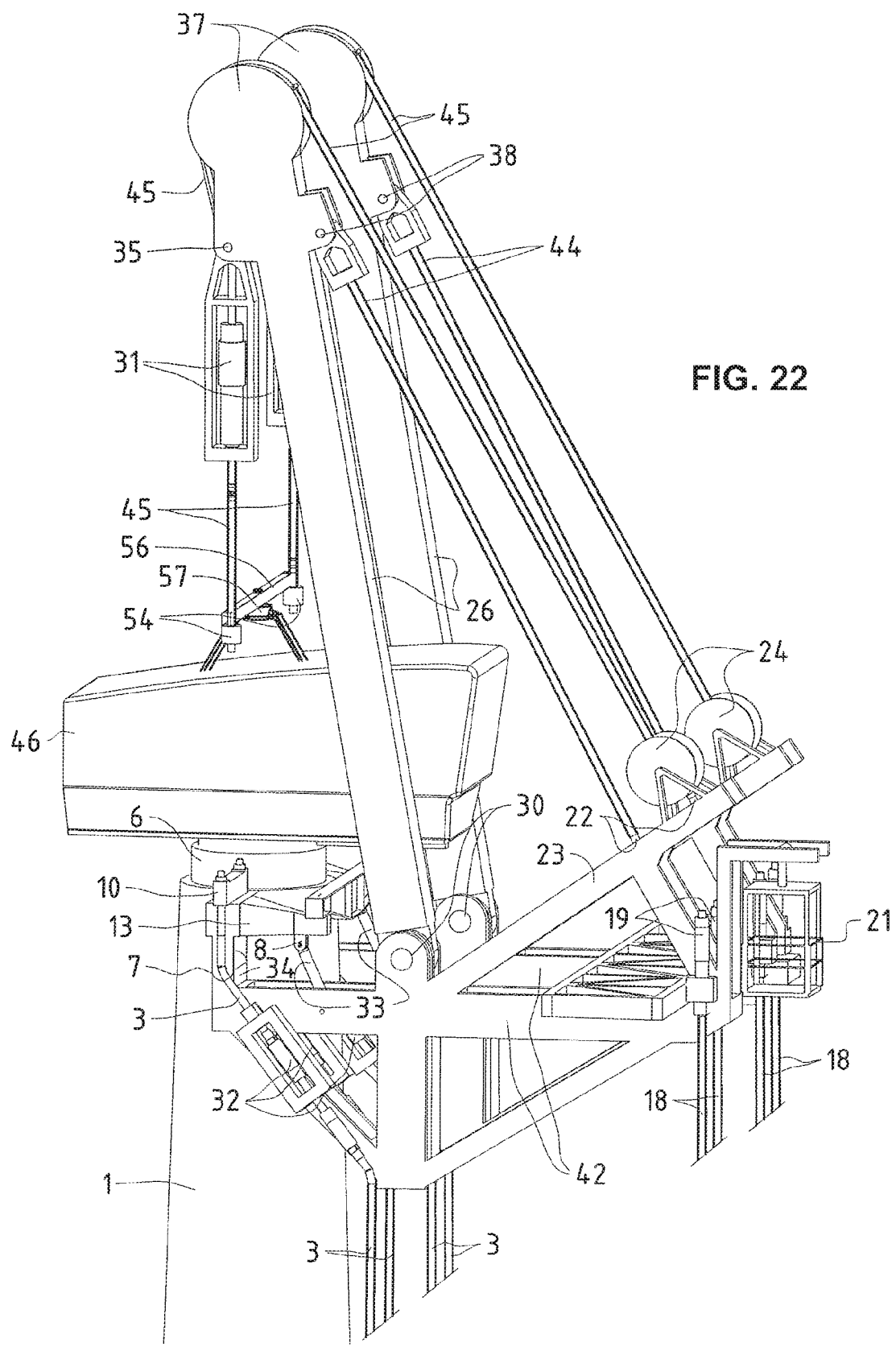
FIG. 22 shows in perspective view a third pivoting operation of the boom arms depicted in FIG. 21.

FIG. 21 shows how load-rotator 57 can be used to rotate the turbine generator 46 such that it will pass between the boom arms 26 as the boom arms 26 are pivoted back towards a near-vertical position such as illustrated in FIG. 22, whereupon the load 46 is in position for installing on the installation fitting 6 provided on the tower 1.

When the boom arms 26 are pivoted to an orientation at which the weight of the load is directly over the centre-line of the tower, as illustrated in FIG. 22, there will be a net downwards pivoting force on the crane apparatus, and tending to rotate the jib-frames 20 back towards the position in which they were lifted up the tower. For this stage of the operation, therefore, pivot actuators 33 may be used to counteract this net pivoting force in order to maintain the angular orientation of the jib-frames 20. If the load is moved beyond the centre line of the tower, then a much greater actuator force would be required.

For the type of lifting operation described here, the actuator 33 would only be required to bear the pivoting force of the weight of the crane apparatus itself. This also means that the rotational moment on the top of the tower can also be minimized, and should not exceed that exerted by the weight of the crane apparatus.

In some implementations of the invention, the separation distance between the boom arms 26 may not be sufficient to allow the load to pass between them—in such cases, the jib-frames can be arranged such that the boom-arm pivot point is offset further away from the tower, to allow clearance between the boom arms 26 and the load 46 when the boom arms 26 are pivoted back to the point at which the load 46 can be installed on the tower 1.

Pivoting of the boom arms 26 with the load suspended from jacks 31 can be achieved by means of pulling means (eg jacks) 22, acting on pivot control cables 44.

From FIGS. 21 and 22, it can also clearly be seen how the large load-bearing tension force is directed through the load-lifting cable 45, to load-lifting jack 31, to load-lifting jack attachment point 35, to pivot control cable attachment point 38, through pivot control cable 44, to pivot control jack 22, directly through a connecting strut (unlabelled) of the jib-frame 20, to counterbalance/control jack 19, through counterbalance/control cables 18, to anchor point 5 (not shown in FIGS. 21 and 22). As can be seen, this arrangement allows all the large forces arising during the load-lifting (several thousand kN, for example) to be borne by straight sections of cable. Parts of the load-bearing cables (45, 44 and 18, for example) which are not under significant tension may be passed around pulleys (37) or reels (24). Because only straight portions of the load-bearing cables are subjected to significant tension forces, this means that thick, strong cables can be used, with the result that the load-lifting capacity of the crane apparatus can be greatly enhanced without multiplying the numbers of cables required. Multiple cables require more complicated jacks and more complicated tension-equalisation techniques.

As will also be apparent, each jib-frame 20 has a force transmission path which can be substantially independent from the other. The cross-member 25 may be used to provide a certain rigidity of the crane apparatus as a whole during the lifting stage, but during load-lifting, each jib-frame 20 can effectively be a separate load-bearing structure. The cross-member 25 may be arranged to tolerate a certain amount of relative (eg rotational pivoting) movement between the two jib-frames 20. The various jacks 19, 22 and 31, and cables 18, 44 and 45, can be adjusted appropriately to maintain the jib-frames 20 approximately aligned with each other, however this adjustment does not require high precision.

FIGS. 23 to 26 show a second, similar load-lifting procedure, in which a pre-assembled hub with three turbine blades 50 is lifted into position and fitted to a generator unit nacelle 46 which has already been installed. A mobile crane 49 can be used to support the lower part of the hub/blade assembly 50 until the latter is lifted clear of the ground. The turbine blades may also be lifted individually and mounted individually to the hub using the crane apparatus.

Once the turbine and blades have been installed, the described procedure can be carried out in reverse. The boom arms 26 are retracted; the crane apparatus is pivoted back down and detached from the bracket assembly 1; the crane apparatus is lowered down the cables 3 and disassembled and removed from site; the elements of the bracket assembly 2 are detached and lowered using light-lifting cables 9.

The described method and apparatus can also be used for lifting the blades and/or generator unit from the top of the tower.

The example method described above has the advantage that no significant lifting equipment or fittings need be left at the top of the tower—a small, light-duty attachment point is all that is required to remain permanently on the tower. This modest attachment point can thus be used to "bootstrap" the kind of heavy-lifting described process above. Note that the bracket assembly 2 may also be left in position temporarily. This may be useful if the generator unit and the rotors/blades are to be installed in different lifting operations, carried out on different days, for example, and possibly using differently rated crane apparatuses (heavy-duty for the generator, medium-duty for the rotors, for example). Were any heavy-duty lifting equipment or fittings to be left at the top of the tower permanently, they would require regular cleaning and maintenance. The crane apparatus described here is self-contained, relatively easily transportable, and can be maintained at a convenient location away from the turbine site. Being self-contained and modular, the crane apparatus is easy to move from one tower to the next on the same site in the case of multiple turbines on the same site. Each jib-frame 20 can be equipped with all the hydraulic pumps, power generation, rams, jacks and/or winches etc. which are needed by the jib-frame for lifting the load, and/or for lifting itself up the tower.

The method has the additional advantage that much of the procedure requires very little communication between personnel at the top of the tower and personnel on the ground.

The invention claimed is:

1. Crane apparatus for lifting a load from a base region of a tower to an elevated region of the tower, the crane apparatus comprising crane-lifting means for lifting the crane apparatus to a crane mounting position on the tower using one or more crane-lifting cables supported at the elevated region of the tower, two boom arms adapted to be displaced outward from the elevated region of the tower, a distal region of each boom arm being provided with cable supporting means for supporting one or more load-lifting cables, a boom support frame for supporting the boom arms such that the boom arms can be arranged on either side of the tower during said lifting of the crane apparatus to the crane mounting position, or such that the boom arms can be arranged on either side of the load during the lifting of the load, the boom support frame-comprising two jib-frames linked by at least one cross-member, said jib-frames and said at least one cross-member being arranged such that the crane apparatus can be assembled straddling the tower with one said jib-frame on either side of the tower, load-lifting means supported at the distal region of one or both boom arms, said load-lifting means being for lifting the load to the elevated region using the one or more load-lifting cables, and separation adjusting means for varying a separation distance between said two jib-frames as the crane apparatus travels up or down the tower.

2. Crane apparatus according to claim 1, wherein said load-lifting means includes one or more first strand jacks arranged for exerting a pulling action on the load-lifting cables, or wherein said crane-lifting means includes one or more second strand jacks arranged for exerting a pulling action on the crane-lifting cables.

3. Crane apparatus according to claim 2, wherein the boom support frame comprises boom displacement means for displacing the boom arms relative to said boom support frame, between a retracted state and a deployed state.

4. Crane apparatus according to claim 3, wherein said boom arms, said boom support frame and said one or more second strand jacks are mutually arranged such that, when said boom arms are in their retracted state during said lifting of the crane apparatus, the centre of gravity of the crane apparatus is below the points of action of said one or more second strand jacks on said crane-lifting cables.

5. Crane apparatus according to claim 2, wherein
the or each first strand jack is secured to the distal region of one of said boom arms, and
the load lifting cables are vertically displaceable relative to the boom support frame by means of the pulling action of the or each first strand jack, such that the load can be lifted by pulling up, or lowered by lowering, the load-lifting cables using the one or more first strand jacks.

6. Crane apparatus according to claim 2, wherein one or more of the first strand jacks are arranged as climbing jacks, securable to the load such that the load can be lifted by means of the one or more said climbing jacks climbing up or down the heavy lifting cables.

7. Crane apparatus according to claim 2, comprising load counterbalancing means for counterbalancing the weight of the load, the load counterbalancing means being arranged to exert a pulling force between a rear region of the crane apparatus and the base region or a lower region of the tower, the rear region being a region of the crane apparatus on the opposite side of the tower from the load being lifted.

8. Crane apparatus according to claim 1, wherein said boom support frame comprises boom arm pivot means for pivoting said boom arms relative to said boom support frame during lifting of the load or during installation of the load at the elevated region.

9. Crane apparatus according to claim 1, wherein at least one of said boom support frame or at least one of said boom arms comprising at least one load-lifting cable take-up means for storing the at least one load-lifting cable, or a part of the at least one load-lifting cable not under tension from the or each load-lifting means.

10. Crane apparatus according to claim 1, said boom support frame comprising frame pivot means for engaging with tower pivot means provided at the crane mounting point of the tower to form a first pivot axis about which the boom support frame can be pivoted, the crane apparatus further comprising at least one pivot actuator for causing said boom support frame to pivot about the first pivot axis.

11. Method of lifting a load to an elevated region of a tower, the method including:

providing a crane apparatus according to claim 1, a crane-lifting step, in which the crane apparatus is raised to the crane mounting position on the tower, the crane-lifting step being accomplished using said crane-lifting means of the crane apparatus acting on the crane-lifting cables, a mounting step, in which the crane apparatus is mounted at the crane mounting position of the tower, a boom arm deployment step, in which said boom arms are displaced relative to said boom support frame from a retracted state relative to said boom support frame to a deployed state, a load-lifting step, in which the load is lifted using said load-lifting means.

12. Method according to claim 11, the method including a tower preparation step, performed before the crane-lifting step, in which a bracket assembly is fitted to the elevated region of the tower, the bracket assembly comprising crane-lifting cable support means for supporting the crane-lifting cables during the crane-lifting step.

13. Method of lowering a load from an elevated region of a tower, the method including:

providing a crane apparatus according to claim 1, a crane-lifting step, in which the crane apparatus is raised to the crane mounting position on the tower, the crane-lifting step being accomplished using said crane-lifting means of the crane apparatus acting on the crane-lifting cables, a mounting step, in which the crane apparatus is mounted at the crane mounting position of the tower, a boom arm deployment step, in which said boom arms are displaced relative to said boom support frame from a retracted state relative to said boom support frame to a deployed state, a load-lowering step, in which the load is lowered using said load-lifting means.

14. Crane apparatus for lifting a load from a base region of a tower to an elevated region of the tower, the crane apparatus comprising crane-lifting device for lifting the crane apparatus to a crane mounting position on the tower including at least one strand jack arranged for exerting a pulling action on at least one crane-lifting cable supported at the elevated region of the tower, two boom arms adapted to be displaced outward from the elevated region of the tower, a distal region of each boom arm being provided with a cable supporting device for supporting one or more load-lifting cables, a boom support frame for supporting the boom arms such that the boom arms can be arranged on either side of the tower during said lifting of the crane apparatus to the crane mounting position, said boom support frame including two jib-frames linked by at least one cross-member, said jib-frames and said cross-member being arranged such that the crane apparatus can be assembled straddling the tower with one jib-frame on either side of the tower, load-lifting device supported at the distal region of at least one of said boom arms, the load-lifting device being for lifting the load to the elevated region using said at least one load-lifting cable, wherein said load-lifting device includes at least one strand jack arranged for exerting a pulling action on the load-lifting cables, and separation adjusting device for varying a separation distance between the two jib-frames as the crane apparatus travels up or down the tower.

\* \* \* \* \*